US011693081B2

(12) United States Patent
Cho

(10) Patent No.: US 11,693,081 B2
(45) Date of Patent: Jul. 4, 2023

(54) METHOD FOR ESTIMATING DISTANCE USING WIRELESS CARRIER SIGNAL PHASE MEASUREMENT

(71) Applicant: Locaila, Inc, San Jose, CA (US)

(72) Inventor: Jaihyung Cho, Daejeon (KR)

(73) Assignee: Locaila, Inc, San Jose, CA (US)

( * ) Notice: Subject to any disclaimer, the term of this patent is extended or adjusted under 35 U.S.C. 154(b) by 19 days.

(21) Appl. No.: 17/008,942

(22) Filed: Sep. 1, 2020

(65) Prior Publication Data
US 2022/0069953 A1    Mar. 3, 2022

(51) Int. Cl.
| | |
|---|---|
| *H04W 4/02* | (2018.01) |
| *G01S 5/00* | (2006.01) |
| *G01S 19/10* | (2010.01) |
| *H04L 5/00* | (2006.01) |
| *H04W 72/0453* | (2023.01) |

(52) U.S. Cl.
CPC .............. *G01S 5/00* (2013.01); *G01S 5/0009* (2013.01); *G01S 19/10* (2013.01); *H04L 5/001* (2013.01); *H04L 5/0051* (2013.01); *H04W 4/02* (2013.01); *H04W 72/0453* (2013.01)

(58) Field of Classification Search
CPC .......................... H04W 72/0453; H04W 4/02
See application file for complete search history.

(56) References Cited

U.S. PATENT DOCUMENTS

| | | | | |
|---|---|---|---|---|
| 10,809,351 | B1 * | 10/2020 | Cho | .......................... G01S 5/10 |
| 2007/0223365 | A1 * | 9/2007 | Tsfaty | ....................... H04L 9/00 |
| | | | | 370/208 |
| 2008/0043866 | A1 * | 2/2008 | Mujtaba | .............. H04L 27/2634 |
| | | | | 375/260 |
| 2009/0323784 | A1 * | 12/2009 | Depienne | ............... H04H 60/80 |
| | | | | 375/219 |
| 2011/0194510 | A1 * | 8/2011 | Gaal | ..................... H04L 27/361 |
| | | | | 370/329 |

(Continued)

FOREIGN PATENT DOCUMENTS

WO    2019141090 A1    7/2019

OTHER PUBLICATIONS

PCT/ISA/210, ISA/US, International Search Report Issued on Application PCT/US2021/048293, dated Feb. 22, 2022, 4 pages.

(Continued)

*Primary Examiner* — Barry W Taylor
(74) *Attorney, Agent, or Firm* — Nicholas Park

(57) ABSTRACT

Provided is a positioning method performed by a user equipment, the positioning method including receiving a first reference signal from a first transmitter and a second reference signal from a second transmitter, extracting a first sample vector based on received data of the first reference signal measured at a plurality of sample times and a second sample vector based on received data of the second reference signal measured at the plurality of sample times, calculating a first phase vector and a second phase vector by performing an inner product operation of a DFT coefficient vector for DFT operation with respect to each of the first and second sample vectors, and calculating a difference between a travel distance of the first reference signal and a travel distance of the second reference signal based on phase information of components included in a conjugate multiplication of the first and second phase vectors.

18 Claims, 9 Drawing Sheets

(56) References Cited

U.S. PATENT DOCUMENTS

| | | | |
|---|---|---|---|
| 2014/0050149 A1* | 2/2014 | Cai | H04L 27/2607 |
| | | | 370/328 |
| 2016/0006557 A1 | 1/2016 | Shirakawa et al. | |
| 2017/0164323 A1 | 6/2017 | Markhovsky et al. | |
| 2018/0017661 A1* | 1/2018 | Morioka | H04W 4/02 |
| 2019/0273536 A1* | 9/2019 | McCallister | H04W 52/52 |
| 2020/0120682 A1 | 4/2020 | Li et al. | |
| 2020/0382263 A1* | 12/2020 | Xu | H04L 5/005 |
| 2020/0408871 A1* | 12/2020 | Da | G01S 5/10 |
| 2021/0242994 A1* | 8/2021 | Bi | H04L 27/2607 |
| 2021/0392660 A1* | 12/2021 | Chen | H04L 27/2613 |
| 2022/0158789 A1* | 5/2022 | Cho | H04L 5/0048 |

OTHER PUBLICATIONS

PCT/ISA/237, ISA/US, International Written Opinion Issued on Application PPCT/US2021/048293, dated Feb. 22, 2022, 7 pages.

\* cited by examiner

METHOD FOR ESTIMATING DISTANCE USING WIRELESS CARRIER SIGNAL PHASE MEASUREMENT

BACKGROUND

The present disclosure of the following description relates to a method and apparatus for measuring a position of a user equipment (UE) using a wireless signal.

A communication system may include a core network (e.g., a mobility management entity (MME), a serving gateway (SGW), and a packet data network (PDN) gateway (PGW)), a base station (e.g., a macro base station, a small base station, and a relay), a user equipment (UE), and the like. Communication between the base station and the UE may be performed using a variety of radio access technology (RAT), for example, 4-th generation (4G) communication technology, 5-th generation (5G) communication technology, wireless broadband (WiBro) technology, wireless local area network (WLAN) technology, and wireless personal area network (WPAN) technology.

In a communication system, a UE may generally transmit and receive data through a base station. For example, if data to be transmitted to a second UE is present, a first UE may generate a message including the data to be transmitted to the second UE and may transmit the generated message to a first base station to which the first UE belongs. The first base station may receive the message from the first UE and may verify that a destination of the received message is the second UE. The first base station may transmit the message to a second base station to which the verified destination, that is, the second UE belongs in a second base station sum time interval. The second base station may receive the message from the first base station and may verify that the destination of the received message is the second UE. The second base station may transmit the message to the verified destination, that is, the second UE. The second UE may receive the message from the second base station and may acquire the data included in the received message.

A reference signal may be transmitted and received between a UE and a base station. As another example, a reference signal may be transmitted and received between two different base stations. The reference signal may be used for various purposes. For example, the UE or the base station may perform synchronization or may estimate a position of the UE using the reference signal. As one of positioning methods using RAT, the UE may perform positioning based on a difference in time of arrival (ToA) between positioning reference signals (PRSs) received from a plurality of base stations or a difference in received phase between reference signals.

However, it is very difficult to estimate a difference in ToA between reference signals or correlation between a phase difference and a position of a UE. In particular, a different positioning method different from the related art may be required to improve the positioning accuracy.

SUMMARY OF THE INVENTION

At least one example embodiment provides a positioning method and apparatus that may improve positioning accuracy.

According to an aspect, there is provided a positioning method performed by a user equipment, the method including receiving a first reference signal from a first transmitter and receiving a second reference signal from a second transmitter; acquiring phase information depending on carrier frequencies of the first reference signal and the second reference signal based on received data of the first reference signal measured at a plurality of sample times and received data of the second reference signal measured at the plurality of sample times; and outputting information about a difference between a travel distance of the first reference signal and a travel distance of the second reference signal based on the phase information depending on the carrier frequencies.

The acquiring of the phase information may include acquiring a first sample vector based on the received data of the first reference signal, acquiring a second sample vector based on the received data of the second reference signal, calculating a first phase vector and a second phase vector by performing an inner product operation of a discrete Fourier transform (DFT) coefficient vector for a DFT operation with respect to each of the first sample vector and the second sample vector, and acquiring the phase information from a conjugate multiplication of the first phase vector and the second phase vector.

A waveform of the first reference signal and a waveform of the second reference signal may be configured to continue in a time interval greater than a symbol size corresponding to a frequency interval of orthogonal frequency division multiplex (OFDM).

The first reference signal and the second reference signal may be transmitted in different time domains, a first subcarrier group for transmitting the first reference signal and a second subcarrier group for transmitting the second reference signal may be the same.

The first reference signal may include a plurality of subcarriers included in a first subcarrier group, and the second reference signal may include a plurality of subcarriers included in a second subcarrier group, and a subcarrier included in the first subcarrier group and a subcarrier included in the second subcarrier group may be orthogonal to each other.

The plurality of subcarriers included in the first subcarrier group and the plurality of subcarriers included in the second subcarrier group may be provided at equal intervals in a frequency domain.

A correction factor may be calculated based on a conjugate multiplication between a first component of the second phase vector and a second component of the second phase vector having an angular frequency index different from that of the first component, and the phase information may be output based on a result of multiplying the conjugate multiplication of the first phase vector and the second phase vector by the correction factor.

A complex signal component of each of the subcarriers included in the first subcarrier group and a complex signal component of each of the subcarriers included in the second subcarrier group may have a conjugate relation.

The second subcarrier group may be spaced apart at a desired distance from the first subcarrier group in the frequency domain, and the desired distance may be determined based on a number of subcarriers included in the first subcarrier group and a size of a fast Fourier transform (FFT) window.

The acquiring of the phase information may include calculating a parameter depending on a clock error between the first transmitter and the second transmitter and the terminal among parameters constituting the conjugate multiplication by linearly combining phase angles of components included in the conjugate multiplication.

The positioning method may further include receiving reference signals from a transmitter group that includes at least three transmitters; calculating first phase information based on reference signals received from a first pair of transmitters among the at least three transmitters included in the transmitter group, and calculating second phase information based on reference signals received from a second pair of transmitters among the at least three transmitters; and determining an integer ambiguity of the second phase information based on the first phase information.

An interval between the first pair of transmitters may be less than an interval between the second pair of transmitters.

The interval between the first pair of transmitters may be less than the carrier wavelength of the reference signals and the interval between the second pair of transmitters may be greater than the carrier wavelength of the reference signals.

According to another aspect, there is provided a positioning reference signal transmission method performed by a plurality of transmitters, the method including transmitting, by a first transmitter, a first reference signal; and transmitting, by a second transmitter, a second reference signal. A waveform of the first reference signal and a waveform of the second reference signal are configured to continue in a time interval greater than a symbol size corresponding to a frequency interval of orthogonal frequency division multiplex (OFDM), and the first reference signal includes a plurality of subcarriers included in a first subcarrier group, and the second reference signal includes a plurality of subcarriers included in a second subcarrier group.

The first reference signal and the second reference signal may be transmitted in different time domains and the first subcarrier group and the second subcarrier group may be the same.

The first reference signal may include a plurality of subcarriers included in a first subcarrier group, and the second reference signal may include a plurality of subcarriers included in a second subcarrier group, and a subcarrier included in the first subcarrier group and a subcarrier included in the second subcarrier group may be orthogonal to each other, and the plurality of subcarriers included in the first subcarrier group and the plurality of subcarriers included in the second subcarrier group may be provided at equal intervals in a frequency domain.

A complex signal component of each of the subcarriers included in the first subcarrier group and a complex signal component of each of the subcarriers included in the second subcarrier group may have a conjugate relation.

The method may further include transmitting, by at least one additional transmitter excluding the first transmitter and the second transmitter, a reference signal. In a transmitter group including the first transmitter, the second transmitter, and the at least one additional transmitter, an interval between a first pair of transmitters and an interval between a second pair of transmitters may differ from each other.

The interval between the first pair of transmitters may be less than a carrier wavelength of the reference signals and the interval between the second pair of transmitters may be greater than the carrier wavelength of the reference signals.

According to at least one example embodiment, a user equipment, for example, a user equipment (UE) 200 of FIG. 1, may receive reference signals transmitted at different positions, may calculate a difference between a travel distance of a first reference signal and a travel distance of a second reference signal from a conjugate multiplication of two phase vectors. Through this, the user equipment may perform positioning in a vertical direction or a horizontal direction at high accuracy. According to at least one example embodiment, the user equipment may analyze reference signals transmitted from at least three transmitters and may solve an integer ambiguity issue of phase information.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

DETAILED DESCRIPTION OF THE INVENTION

Figure 1:
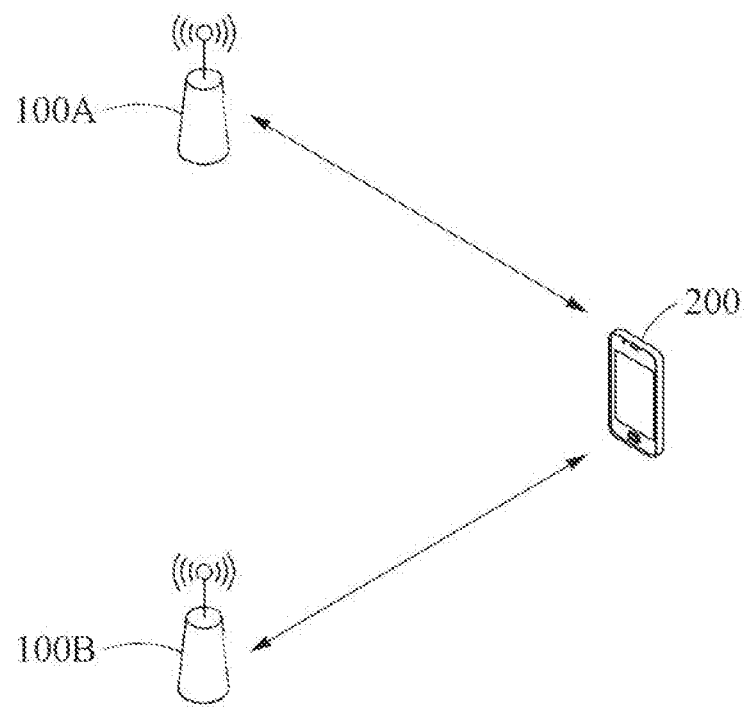
FIG. 1 illustrates an example of a communication system according to at least one example embodiment.

Various modifications and changes may be made to the present disclosure and the disclosure may include various example embodiments. Specific example embodiments are described in detail with reference to the accompanying drawings. The example embodiments, however, may be embodied in various different forms, and should not be construed as being limited to only the specific example embodiments. Rather, the example embodiments should be understood to include all of the modifications, equivalents, and substitutions included in the spirit and technical scope of the disclosure.

Although the terms "first," "second," etc., may be used herein to describe various components, the components should not be limited by these terms. These terms are only used to distinguish one component from another component. For example, a first component may also be termed a second component and, likewise, a second component may be termed a first component, without departing from the scope of this disclosure. As used herein, the term "and/or" includes any and all combinations of one or more of the associated items.

When a component is referred to as being "connected to" or "coupled to" another component, the component may be directly connected to or coupled to the other component, or one or more other intervening components may be present. In contrast, when a component is referred to as being "directly connected to" or "directly coupled to," there is no intervening component.

The terms used herein are used to simply explain specific example embodiments and are not construed to limit the present disclosure. The singular forms "a," "an," and "the," are intended to include the plural forms as well, unless the context clearly indicates otherwise. It will be further understood that the terms "comprises/comprising (incudes/including)," and "has/having" when used in this specification, specify the presence of stated features, integers, steps, operations, elements, and/or components, but do not preclude the presence or addition of one or more other features, integers, steps, operations, elements, components, and/or groups, thereof.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, example embodiments will be described in detail with reference to the accompanying drawings. For simplicity of description and general understanding of the disclosure, like reference numerals refer to like components throughout the present specification although they are illustrated in different drawings.

Herein, a reference signal may include, for example, a signal for positioning of a user equipment (UE), a signal for synchronization of the UE or a base station, and the like. However, it is provided as an example only. A method of estimating a reception delay time of a reference signal disclosed herein may apply to estimating a reception delay time of another signal aside from the reference signal. Here, although an example embodiment is described based on an example of estimating the reception delay time of the reference signal for clarity of description, it is provided as an example only. It should be understood that a method of estimating the reception delay time of the other signal aside from the reference signal is included in the example embodiment.

FIG. 1 illustrates an example of a communication system according to at least one example embodiment.

Referring to FIG. 1, the communication system may include a first transmitter 100A and a second transmitter 100B. Here, each of the first transmitter 100A and the second transmitter 100B may be referred to as, for example, NodeB, next generation NodeB, evolved NodeB, gNodeB, a base transceiver station (BTS), a radio base station, a radio transceiver, an access point, an access node, a road side unit (RSU), a radio remote head (RRH), a transmission point (TP), a transmission and reception point (TRP), a relay node, and the like. A UE 200 may also be referred to as a terminal, an access terminal, a mobile terminal, a station, a subscriber station, a mobile station, a portable subscriber station, a node, a device, and the like.

The first transmitter 100A may transmit a first reference signal. The second transmitter 100B may transmit a second reference signal. The UE 200 may receive the first reference signal and the second reference signal. The UE 200 may receive the first reference signal and the second reference signal, may calculate a phase difference between the first reference signal and the second reference signal, and may calculate position information of the UE 200 based on the phase difference. As another information, when the UE 200 transmits information about the phase difference to the first transmitter 100A or the second transmitter 100B, the first transmitter 100A or the second transmitter 100B may also calculate position information of the UE 200.

Although FIG. 1 illustrates two transmitters, for example, the first transmitter 100A and the second transmitter 100B, it is provided as an example only. To solve an inter ambiguity issue in calculating a phase difference, the UE 200 may receive reference signals from at least three transmitters, which is further described below. Also, although FIG. 1 illustrates that the first transmitter 100A and the second transmitter 100B are spatially separate from each other, the first transmitter 100A and the second transmitter 100B may belong to the same base station. In this case, modulation of the first reference signal and the second reference signal may be performed through a single base station.

Figure 2:
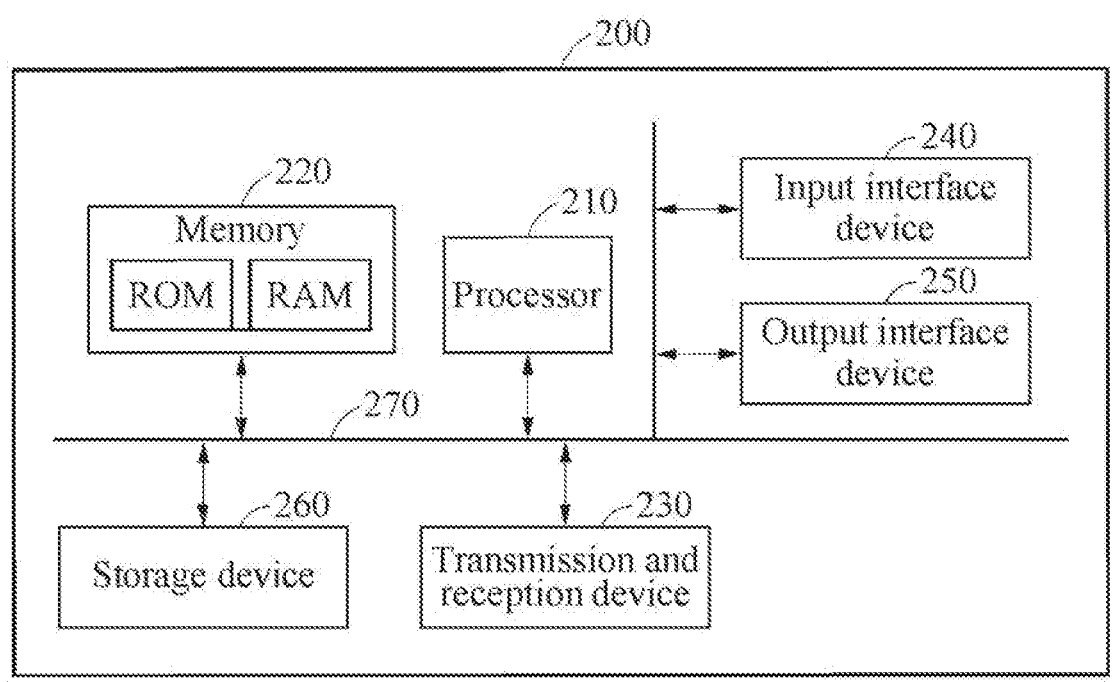
FIG. 2 is a diagram illustrating an example of a configuration of a communication node included in a communication system according to at least one example embodiment.

FIG. 2 is a diagram illustrating an example of a configuration of a communication node included in a communication system according to at least one example embodiment. Like reference numeral used for the UE 200 of FIG. 1 also applies to a reference numeral of the communication node of FIG. 2. A configuration of FIG. 2 may also apply to the first transmitter 100A or the second transmitter 100B.

Referring to FIG. 2, a communication node 200 may include at least one processor 210, a memory 220, and a transmission and reception device 230 configured to perform communication through connection to a network. Also, the communication node 200 may further include an input interface device 240, an output interface device 250, and a storage device 260. Here, the components included in the communication node 200 may communicate with each other through connection to a bus 270.

The processor 210 may execute a program command stored in at least one of the memory 220 and the storage device 260. The processor 210 may refer to a central processing unit (CPU), a graphics processing unit (GPU), or an exclusive processor that performs methods according to example embodiments. Each of the memory 220 and the storage device 260 may be configured as at least one of a volatile storage medium and a nonvolatile storage medium. For example, the memory 220 may be configured as at least one of read only memory (ROM) and random access memory (RAM).

Figure 3:
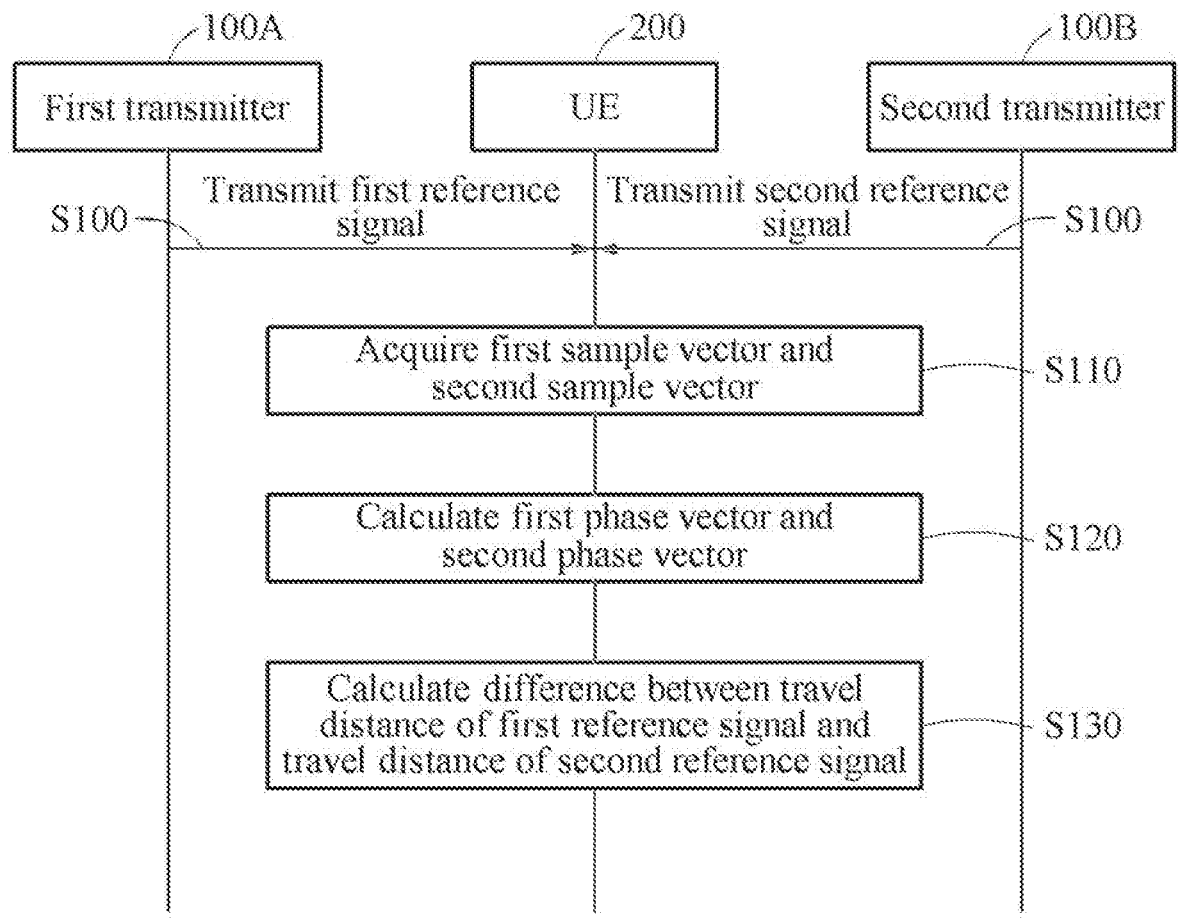
FIG. 3 is a flowchart illustrating an example of a positioning method according to at least one example embodiment.

FIG. 3 is a flowchart illustrating an example of a positioning method according to at least one example embodiment.

Referring to FIG. 3, in operation S100, the first transmitter 100A may transmit a first reference signal, and the second transmitter 100B may transmit a second reference signal. The first transmitter 100A may transmit the first reference signal in a continuous waveform in a time interval greater than a symbol size. The second transmitter 100B may transmit the second reference signal in a continuous waveform in a time interval greater than the symbol size. If each of the first reference signal and the second reference signal has a continuous waveform in the time interval greater than the symbol size, the UE 200 may easily receive a corresponding reference signal and extract a sample vector.

Figure 4:
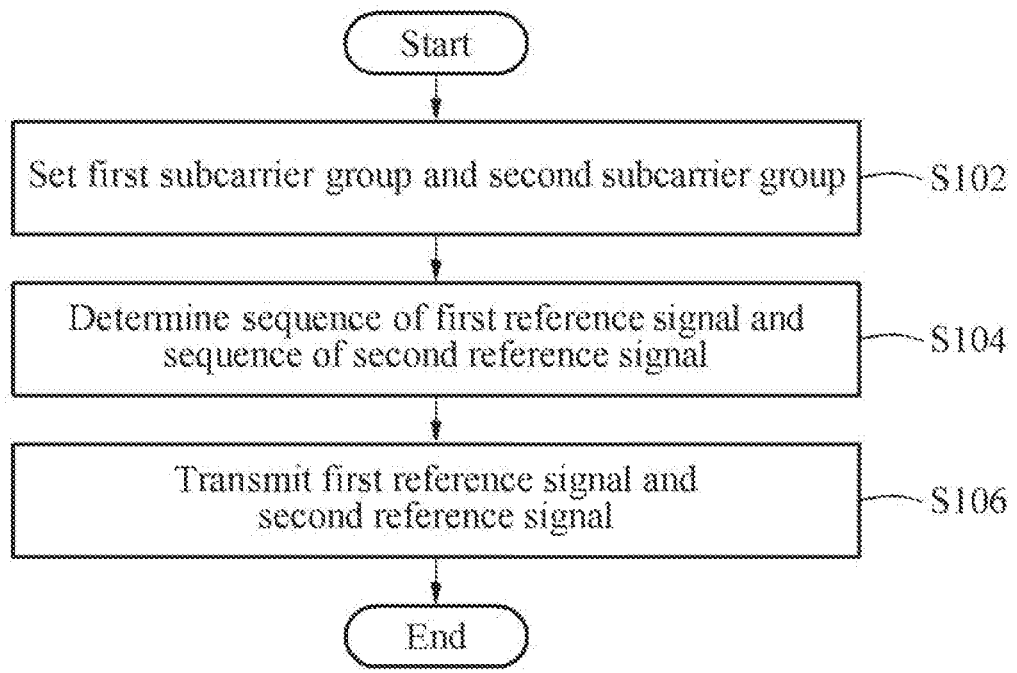
FIG. 4 is a flowchart illustrating an example of performing operation S100 of FIG. 3.

FIG. 4 is a flowchart illustrating an example of performing operation S100 of FIG. 3.

Referring to FIG. 4, in operation S102, the first transmitter 100A and the second transmitter 100B may set a first subcarrier group for transmitting the first reference signal and a second subcarrier group for transmitting the second reference signal. The first transmitter 100A may transmit the first reference signal using the first subcarrier group, and the second transmitter 100B may transmit the second reference signal using the second subcarrier group. Subcarriers of the first subcarrier group may be orthogonal to subcarriers of the second subcarrier group. However, it is provided as an example only. For example, if orthogonality between the first reference signal and the second reference signal is guaranteed in a time domain, the first subcarrier group and the second subcarrier group may not be orthogonal to each other.

Subcarriers included in the first subcarrier group may be provided at equal intervals in a frequency domain.

Figure 5:
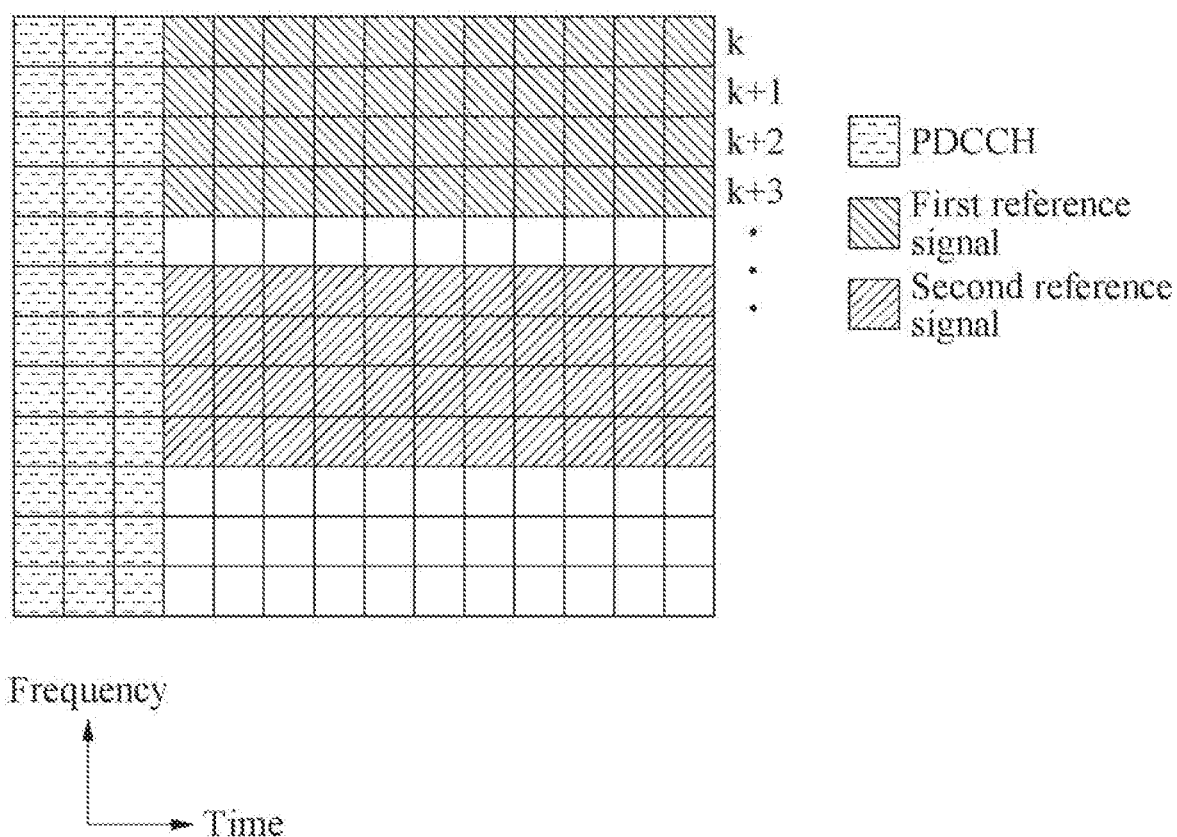
FIG. 5 illustrates an example of a first subcarrier group and a second subcarrier group according to at least one example embodiment.

FIG. 5 illustrates an example of a first subcarrier group and a second subcarrier group according to at least one example embodiment.

Referring to FIG. 5, subcarriers included in the first subcarrier group for transmitting a first reference signal may be provided at equal intervals in a frequency domain. Likewise, subcarriers included the second subcarrier group for transmitting a second reference signal may be provided at equal intervals. Each of the first reference signal and the second reference signal may be transmitted through a plurality of consecutive symbols. Since each of the first reference signal and the second reference signal has a waveform continuous in a boundary between symbols, the UE 200 receiving the first reference signal and the second reference signal may readily acquire sample vectors.

FIG. 5 illustrates an example in which an interval between the subcarriers of the first subcarrier group is 1 and an example in which an interval between the subcarriers of the second subcarrier group is 1. However, it is provided as an example only. For example, the subcarriers included in the first subcarrier group or the second subcarrier group may be provided at intervals greater than 1. Also, the interval between the subcarriers of the first subcarrier group may differ from the interval between the subcarriers of the second subcarrier group.

Referring again to FIG. 4, in operation S104, the first transmitter 100A and the second transmitter 100B may determine a sequence of the first reference signal and a sequence of the second reference signal. The first transmitter 100A and the second transmitter 100B may determine the sequence of the first reference signal and the sequence of the second reference signal such that the first reference signal and the second reference signal may be continuous in the boundary between the symbols. In operation S106, the first transmitter 100A may transmit the first reference signal generated using the sequence of the first reference signal. The second transmitter 100B may transmit the second reference signal generated using the sequence of the second reference signal.

Hereinafter, a sequence of a reference signal such that the reference signal may be continuous in a boundary between symbols is described.

Figure 6:
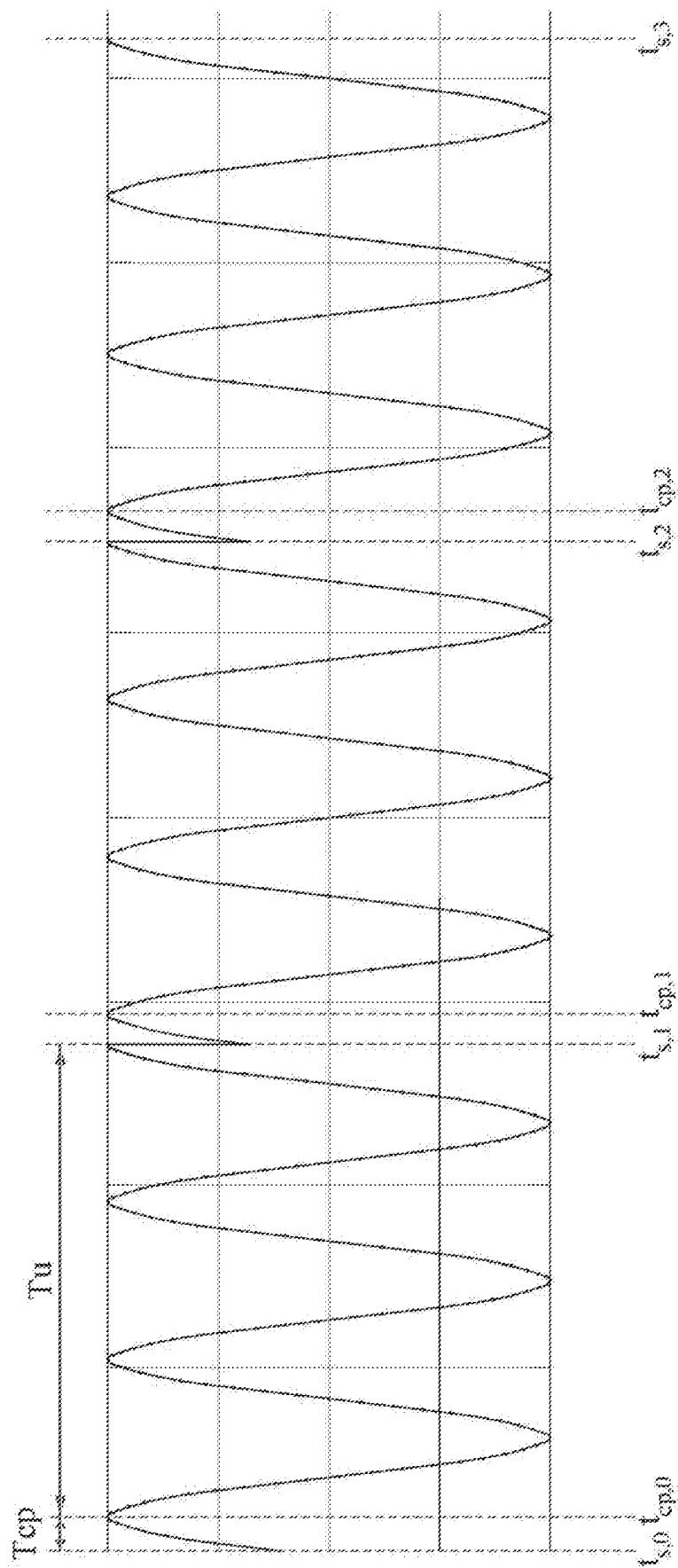
FIG. 6 illustrates an example of a waveform of a reference signal in the case of configuring the reference signal using a sequence used to generate a general sine wave according to at least one example embodiment.

FIG. 6 illustrates an example of a waveform of a reference signal in the case of configuring the reference signal using a sequence used to generate a general sine wave according to at least one example embodiment.

Referring to FIG. 6, a waveform of a reference signal may be discontinuous in a boundary between symbols due to presence of a cyclic prefix (CP) duration. Therefore, the first transmitter 100A and the second transmitter 100B may phase-shift a sequence of the reference signal by considering the CP duration such that the waveform of the reference signal may be continuous in the boundary between symbols.

For example, the first transmitter 100A and the second transmitter 100B may generate a reference signal according to Equation 1.

$$X_\ell[k] = X_{\ell-1}[k] \cdot \exp\left(2\pi jk \cdot \frac{T_{CP,\ell-1}}{T_u}\right) \quad \text{[Equation 1]}$$

In Equation 1, $X_l[k]$ denotes a frequency domain complex exponentiation representing an initial phase and amplitude of a k-th subcarrier of an l-th symbol, $T_u$ denotes a length of a valid period of a symbol, and $T_{CP,l-1}$ denotes a length of a CP duration of an (l−1)-th symbol. Here, l denotes a natural number. In an LTE standard, an index of a symbol may be counted for each slot. If a normal CP is used in the LTE standard, l=1, 2, . . . 6. If an extended CP is used in the LTE standard, l=1, 2, . . . 5. In a 5G NR standard, an index of a symbol may continuously increase in a time domain. Accordingly, in the 5G NR standard, l may be a random natural number.

Figure 7:
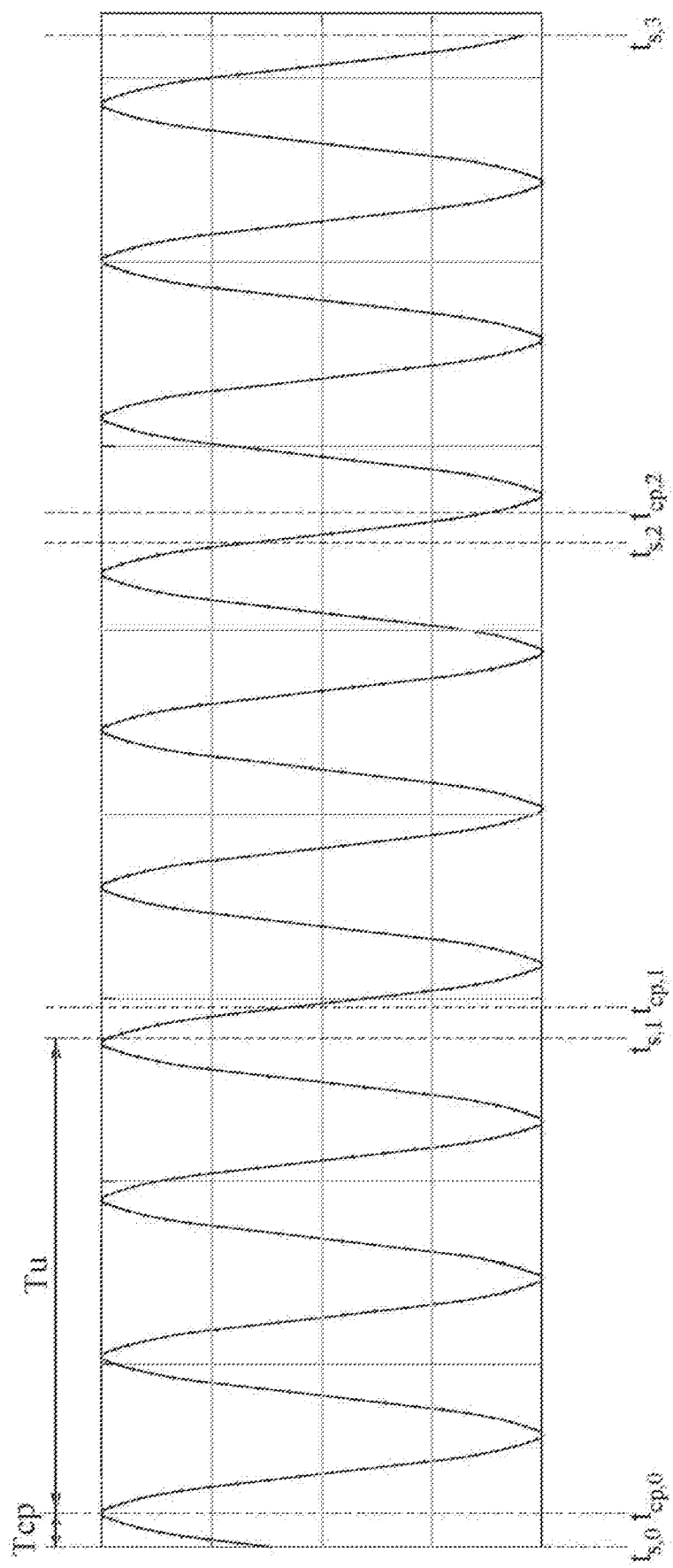
FIG. 7 illustrates an example of a waveform of a reference signal that continues in a plurality of symbol periods according to at least one example embodiment.

Referring to Equation 1, in a sequence of a reference signal, a sequence value corresponding to the l-th symbol may correspond to a value that is phase-shifted by $$2\pi k \cdot \frac{T_{CP,\ell-1}}{T_u}$$

from a sequence value corresponding to the (l−1)-th symbol. For example, a waveform of a reference signal that continues in a plurality of symbol periods may be represented as FIG. 7.

Differently representing Equation 1, Equation 1 may be expressed as Equation 2.

$$X_\ell[k] = X_0[k] \cdot \exp\left(2\pi jk \cdot \sum_{i=1}^{l} \frac{T_{CP,i-1}}{T_u}\right) \quad \text{[Equation 2]}$$

In Equation 2, $X_0[k]$ denotes a frequency domain complex exponentiation representing an initial phase and amplitude of a k-th subcarrier of an initial symbol (symbol index=0).

If the normal CP is applied in the LTE standard, a sequence of a reference signal may be represented as Equation 3.

$$X_{s,\ell}[k] = (-1)^{s \cdot k} \varphi_{init}^k \cdot \exp\left(2\pi jk \cdot \ell \cdot \frac{T_{cp}}{T_u}\right) \quad \text{[Equation 3]}$$

In Equation 3, $\varphi_{init}^k$ denotes a frequency domain complex exponentiation representing an initial phase and amplitude of a k-th subcarrier of an initial symbol of an initial slot. Also, s denotes a slot index, l denotes a symbol index, and $X_{s,l}[k]$ denotes a frequency domain complex exponentiation representing an initial phase and amplitude of a k-th subcarrier of an l-th symbol of an s-th slot. If k is an even number, $(-1)^{s \cdot k}$ is 1 at all times. Therefore, an initial phase of a k-th subcarrier of a start symbol of a slot may be the same regardless of a slot index. In contrast, if k is an odd number, $(-1)^{s \cdot k}$ is −1 for s=odd number and 1 for s=even number. Therefore, the initial phase of the k-th subcarrier of the start symbol of the slot may vary based on a slot index. If the symbol index l is numbered for each slot, l may be one of 0, 1, 2, . . . 6. Accordingly, P=l and $$\frac{T_{cp}}{T_u} = 9/128.$$

In describing the following equations, the description of notations that repeat the notations of Equation 3 is omitted. If the normal CP is applied in the 5G NR standard, the sequence of the reference signal may be represented as Equation 4.

$$X_{s,\ell}[k] = (-1)^{s \cdot k \cdot \delta(\mu)} \varphi_{init}^k \cdot \exp\left(2\pi jk \cdot P \cdot \frac{T_{cp}}{T_u}\right),$$ [Equation 4]

$$P = \ell \bmod(7 \cdot 2^\mu), \mu = 0, 1, 2, 3 ..$$

In Equation 4, mod denotes a modulo function used to acquire a remainder. In the case of the normal CP of the LTE standard, numerology number μ=0 and accordingly, P and l=0, . . . 6. Also, δ(μ) is a Dirac delta function that is defined as 1 only if μ=0. An index portion equation of −1 that determines a sign of a subcarrier, i.e., s·k·δ(μ), is defined if μ=0, that is, if a subcarrier spacing is 15 kHz. The index portion of −1 is 0 in other subcarrier spacings, that is, if μ>0. Therefore, start symbols of all of the subcarriers have a positive sign.

In the 5G NR standard, if the symbol index is numbered based on a subframe unit and, in this instance, if subcarrier spacing=15 kHz, a sequence of a reference signal may be represented as Equation 5.

$$X_\ell[k] = (-1)^{s \cdot k} \varphi_{init}^k \cdot \exp\left(j\frac{9}{64}kP\pi\right)$$ [Equation 5]

$$s = \left[\frac{\ell}{7}\right], P = \ell \bmod 7$$

With the assumption that the normal CP is applied, if the subcarrier spacing is 15 kHz or higher in the 5G NR standard, a sequence of a reference signal may be represented as Equation 6.

$$\begin{cases} X_\ell[k] = \varphi_{init}^k & l = 0 \text{ or } l = 7 \cdot 2^\mu \\ X_\ell[k] = \varphi_{init}^k \cdot \exp\left(j\frac{9}{64}k\ell\pi\right) & l \neq 0 \text{ and } l \neq 7 \cdot 2^\mu \end{cases}$$ [Equation 6]

If the extended CP is applied in the LTE standard and the 5G NR standard, a sequence of a reference signal may be represented as Equation 7.

$$X_{s,\ell}[k] = (-1)^{s \cdot k} \varphi_{init}^k \cdot \exp\left(2\pi jk \cdot \ell \cdot \frac{T_{cp}}{T_u}\right), \text{ in } LTE$$ [Equation 7]

$$X_{s,\ell}[k] = \varphi_{init}^k \cdot \exp\left(2\pi jk \cdot \ell \cdot \frac{T_{cp}}{T_u}\right) \text{ in } 5GNR$$

In Equation 7, in the LTE standard, l denotes a symbol index number and may be 0 . . . 5. Also, in the 5G NR standard, l denotes the symbol index number and may be 0 . . . 11.

If a symbol index is numbered for each subframe and the extended CP is applied, a sequence of a reference signal may be represented as Equation 8.

$$X_{s,\ell}[k] = (-1)^{s \cdot k} \varphi_{init}^k \cdot \exp\left(2\pi jk \cdot \ell \cdot \frac{T_{cp}}{T_u}\right),$$ [Equation 8]

$$s = \left[\frac{\ell}{6}\right], P = l \bmod 6 \text{ in } LTE$$

$$X_{s,\ell}[k] = \varphi_{init}^k \cdot \exp\left(2\pi jk \cdot \ell \cdot \frac{T_{cp}}{T_u}\right),$$

$$P = l \bmod 24 \text{ in } 5GNR$$

In Equation 8, l denotes a symbol index number and may be 0 . . . 5. If 60 kHz subcarrier spacing is applied, P=0 . . . 23 in a symbol of an extended CP and $T_{cp}/T_u=\frac{1}{4}$.

A layer of a first resource block for transmitting the first reference signal and a layer of a second resource block for transmitting the second reference signal may be set to differ from each other. Therefore, a subcarrier signal of the first subcarrier group and a subcarrier signal of the second subcarrier group may be modulated to a carrier signal in which a frequency and a phase are synchronized by an independent radio frequency (RF) front end and thereby transmitted through different physical antennas, relays, or external transmission devices.

The first transmitter 100A and the second transmitter 100B may be separate from each other in a horizontal direction. In this case, the UE 200 may receive the first reference signal and the second reference signal and may estimate a position of the UE 200 on a horizontal plane. As another example, the first transmitter 100A and the second transmitter 100B may be separate from each other in a vertical direction. In this case, the UE 200 may receive the first reference signal and the second reference signal and may estimate vertical position coordinates of the UE 200. The UE 200 may also estimate a distance between the first transmitter 100A or the second transmitter 100B and the UE 200 in the horizontal direction. As another example, the first transmitter 100A) and the second transmitter 100B may be separate from each other in the horizontal direction and may also be separate from each other in the vertical direction. In this case, the UE 200 may estimate information about a position of the UE 200 both in the vertical direction and the horizontal direction.

The first reference signal and the second reference signal may be transmitted through different layers and antenna ports in different timelines on a time axis of a resource grid. Through this, a carrier phase difference, that is, a phase difference using a carrier signal may be easily calculated. The first reference signal and the second reference signal are orthogonal in a time domain. Therefore, although the first subcarrier group and the second subcarrier group include the same or partially overlapping subcarriers, an interference issue may not arise. For example, if the first reference signal is transmitted through an antenna port number 1 using subcarriers to which subcarrier numbers s1, s2, s3 . . . are allocated on a layer 1 in a time t, the second reference signal may be transmitted through an antenna port number 2 using subcarriers to which the same subcarrier numbers s1, s2, s3 . . . are allocated on a layer 2 in a time t−u, which differs from the time t. The antenna port refers to a logical configuration and may not be mapped to a physical external antenna or a wireless transmission device.

As another example, the first reference signal and the second reference signal may be transmitted in the same timeline and, here, a frequency domain of a subcarrier group of each reference signal may be set to be different. In the case of an OFDM system in which a total number of subcarriers, that is, a size of a fast Fourier transform (FFT) window is N-th, s1-th, s2-th, s3-th . . . subcarrier signals may have a conjugate relation with (N-s1)-th, (N-s2)-th, (N-s3)-th . . . subcarrier signals, respectively. In this case, subcarrier signals of two groups may have the same frequency and opposite imaginary part signs.

Therefore, if the first subcarrier group includes subcarriers to which subcarrier numbers s1, s2, s3 . . . are allocated and the second subcarrier group includes subcarriers to which subcarrier numbers N-s1, N-s2, N-s3 . . . are allocated, the first subcarrier group and the second subcarrier group may be orthogonal to each other. In addition, subcarrier signals of the two groups, that is, the first subcarrier group and the second subcarrier group, have the conjugate relation. Accordingly, a phase difference between reference signals may be easily calculated, which is described below.

Hereinafter, the first reference signal transmitted from the first transmitter 100A and the first reference signal received at the UE 200 in operation S100 are described using equations. The following equations are provided to help understanding of example embodiments and thus may be easily modified by those skilled in the art within the scope of the example embodiments.

A baseband of the first reference signal transmitted from the first transmitter 100A at a time t may be represented as Equation 9.

$$B_a(t) = A_1 e^{i\omega_1 t} + A_2 e^{i\omega_2 t} + \ldots + A_m e^{i\omega_m t} = \sum_{q=1}^{m} A_q e^{i\omega_q t} \quad \text{[Equation 9]}$$

In Equation 9, $B_a(t)$ denotes a first reference signal transmitted in a baseband at a time t, and $A_q$ denotes an amplitude and an initial phase component of a subcarrier signal having an angular frequency $\omega_q$. The first transmitter 100A may modulate the baseband signal of the first reference signal to a passband signal using a carrier signal having an angular frequency $\omega_c$ and may transmit the modulated passband signal. Likewise, the second transmitter 100B may also modulate a baseband signal of the second reference signal to a passband signal and may transmit the modulated passband signal. If the first transmitter 100A and the second transmitter 100B belong to the same base station, modulation of the first reference signal and the second reference signal may be performed by a single base station.

The first reference signal modulated to the passband signal may be represented as Equation 10.

$$S_a(t) = B_a(t) \cdot e^{i\omega_c t} = \quad \text{[Equation 10]}$$
$$\left(A_1 e^{i\omega_1 t} + A_2 e^{i\omega_2 t} + \ldots + A_m e^{i\omega_m t}\right) \cdot e^{i\omega_c t} = \sum_{q=1}^{m} A_q e^{i(\omega_c + \omega_q)t}$$

In Equation 10, $S_a(t)$ denotes a first reference signal modulated to a passband signal, $\omega_c$ denotes an angular frequency of a carrier, a time t denotes a time in a time interval in which the first reference signal is transmitted. For example, if the reference signal continues during n symbol periods, t may be one of values between 0 and n×($T_u+T_{CP}$).

The first reference signal of passband may arrive at the UE 200 through a linear path if an obstacle between the first transmitter 100A and the UE 200 is absent, and may arrive at the UE 200 through a multipath if the obstacle between the first transmitter 100A and the UE 200 is present. For example, if the first reference signal arrives at the UE 200 through propagation during a time $r_{a1}$, the first reference signal received at the UE 200 may be represented as Equation 11.

$$S_a(t - \tau_{a1}) = \sum_{q=1}^{m} A_q e^{i(\omega_c + \omega_q)(t - \tau_{a1})} = e^{i\omega_c(t - \tau_{a1})} \sum_{q=1}^{m} A_q e^{i\omega_q(t - \tau_{a1})} \quad \text{[Equation 11]}$$

The UE 200 may demodulate, to a baseband signal, a first reference signal of a passband received at the UE 200, as represented as Equation 11. The UE 200 may multiply the received passband signal by a factor for removing an angular frequency component $\omega_c$ of a carrier. This process may be represented as Equation 12.

$$y_a(t) = e^{-i\omega_c(t-\epsilon)} \cdot S_a(t - \tau_{a1}) = \quad \text{[Equation 12]}$$
$$e^{-i\omega_c(t-\epsilon)} \cdot e^{i\omega_c(t-\tau_{a1})} \sum_{q=1.}^{m} A_q e^{i\omega_q(t-\tau_{a1})} =$$
$$e^{-i\omega_c(\tau_{a1}-\epsilon)} \cdot \sum_{q=1}^{m} A_q e^{i\omega_q(t-\tau_{a1})}$$

In Equation 12, $y_a(t)$ denotes a result of converting a first reference signal received at the UE 200 to a baseband signal, and E denotes a local clock error that occurs due to mismatch between a clock of a receiving UE and a clock of a transmitting base station.

Referring to Equation 12, in $y_a(t)$, $e^{i\omega_c t}$ may disappear, however, a phase shift component $e^{-i\omega_c(\tau_{a1}-\epsilon)}$ may remain due to the delay time $\tau_{a1}$ and the local clock error $\epsilon$. Although it is difficult to acquire a detailed value of the phase shift component $e^{-i\omega_c(\tau_{a1}-\epsilon)}$, a phase shift amount may be proportional to the angular frequency $\omega_c$ of the carrier. That is, a result of demodulating the first reference signal received at the UE 200 may include a phase component depending on the angular frequency $\omega_c$ of the carrier. Accordingly, phase information used to calculate a difference between a travel distance of the first reference signal and a travel distance of the second reference signal may include a term depending on the angular frequency $\omega_c$ of the carrier and a size thereof may be amplified. Accordingly, the positioning performance may be improved.

Referring again to FIG. 3, in operation S110, the UE 200 may extract a first sample vector. The UE 200 may acquire the first sample vector by converting first reference signals received at a plurality of points in times to baseband signals. For example, the UE 200 may extract the first sample vector by converting first reference signals received at N points in times to baseband signals. In a general OFDM system, a value of N may be determined based on a size of an FFT window. The first sample vector may be represented as Equation 13.

$$Y_a(t) = \begin{bmatrix} y_a(t) \\ y_a(t-1) \\ \vdots \\ y_a(t-N+1) \end{bmatrix} \quad \text{[Equation 13]}$$

In Equation 13, $Y_a(t)$ denotes a first sample vector that includes samples of first reference signal received at N sample times. If a waveform of the first reference signal discontinues during a plurality of symbol periods, a time interval in which the following FFT operation is applicable is limited and thus, it may not be easy for the UE 200 to readily change t of Equation 13. In contrast, if the waveform of the first reference signal continues during the plurality of symbol periods, the UE 200 may easily acquire a plurality of sample vectors by changing t of Equation 13, without considering a boundary between symbols.

In operation S120 of FIG. 3, the UE 200 may calculate a first phase vector from a sample vector of the first reference signal. Hereinafter, a process of calculating, by the UE 200, a phase vector of the first reference signal is described as an example.

Complex conjugate numbers of subcarriers corresponding to N sample times may be represented as a vector as shown in Equation 14.

$$DFT_k(t-\epsilon) = [e^{-i\omega_k(t-\epsilon)} e^{-i\omega_k(t-1-\epsilon)} e^{-i2\omega_k(t-2-\epsilon)} \ldots e^{-i\omega_k(t-N+1-\epsilon)}]$$ [Equation 14]

In Equation 14, $DFT_k(t-\epsilon)$ denotes a discrete Fourier transform (DFT) coefficient vector used for an FFT operation of a k-th subcarrier having an angular frequency $\omega_k$, and $\epsilon$ denotes a local clock error that occurs due to mismatch between a clock of the UE 200 and a clock of the first transmitter 100A. Components of the DFT coefficient vector may rotate on a complex plane according to an increase in $t-\epsilon$.

The UE 200 may perform an inner product operation on the sample vector of Equation 13 and the DFT coefficient vector of Equation 14. The UE 200 may extract a phase of each subcarrier component by performing the inner product operation. The UE 200 may calculate a sum of result values acquired by multiplying each of components of the DFT coefficient vector (complex conjugate number values) and each of components of the sample vector through the inner product operation.

The aforementioned operation process may be represented as Equation 15.

$$Y_k = DFT_{kk}(t-\epsilon) \cdot \begin{bmatrix} y_a(t) \\ y_a(t-1) \\ \vdots \\ y_a(t-N+1) \end{bmatrix} =$$ [Equation 15]

$$\sum_{n=0}^{N-1} y_a(t-n) e^{-i\omega_k(t-n-\epsilon)} = N \cdot A_k e^{-i(\omega_c+\omega_k)(\tau_{a1}-\epsilon)} + \sigma_a$$

$$\sigma_a = \sum_{n=0}^{N-1} \sum_{q=1}^{m, q \neq k} A_q e^{i((\omega_q - \omega_k)(t-n) - \omega_q \tau_{a1} + \omega_k \epsilon)} \approx 0$$

In Equation 15, $y_a(t)$ denotes data acquired by converting a first reference signal received at the UE 200 at a time t to a baseband signal, and N denotes a number of sample vector components. N may correspond to a size of a sum time interval in the inner product operation. In the general OFDM system, N may be determined based on a size of the FFT window.

Referring to Equation 15, a result of performing an inner product operation of $DFT_k(t-\epsilon)$ and $Y_a(t)$ may be represented as a sum of $N \cdot A_k e^{-i(\omega_c+\omega_k)(\tau_{a1}-\epsilon)}$ that is a portion independent from the time t and an error component $\sigma_a$. Here, $\sigma_a$ may act as an interference component by noise and other orthogonal subcarrier components, thereby degrading a positioning accuracy. The UE 200 may converge a value of $\sigma_a$ to 0 and thereby ignore the same by averaging values calculated by collecting a plurality of samples. To this end, the UE 200 may acquire a plurality of sample vectors by changing a start time t of a time interval of a sample vector. If a waveform of the first reference signal continues during a plurality of symbol periods, the UE 200 may easily acquire a plurality of sample vectors. As described above, $\epsilon$ denotes the local clock error that occurs due to mismatch between the clock of the UE 200 and the clock of the base station that manages the first transmitter 100A or the first transmitter 100A.

In Equation 15, a phase of a component $N \cdot A_k e^{-i(\omega_c+\omega_k)(\tau_{a1}-\epsilon)}$ corresponding to a k-th subcarrier may include a factor that is proportional to a propagation delay time $\tau_{a1}$ between the first transmitter 100A and the UE 200. The factor may include a multiplication of $\tau_{a1}$ and $\omega_c$. That is, in an inner product operation result of the UE 200, a phase shift amount of an element corresponding to each component of an angular frequency of a subcarrier may depend on an angular frequency of a carrier.

In the aforementioned description, only the k-th subcarrier signal having the angular frequency $\omega_k$ is considered. If the first subcarrier group of the first reference signal includes a subcarrier group having angular frequencies $\omega_1 \sim \omega_m$, Equation 15 may be normalized as represented as Equation 16.

$$\mathbb{Y}_A = \begin{bmatrix} Y_1 \\ Y_2 \\ \vdots \\ Y_m \end{bmatrix} = \begin{bmatrix} DFT_1(t-\epsilon) \\ DFT_2(t-\epsilon) \\ \vdots \\ DFT_m(t-\epsilon) \end{bmatrix} \cdot \begin{bmatrix} y_a(t) \\ y_a(t-1) \\ \vdots \\ y_a(t-N+1) \end{bmatrix} =$$ [Equation 16]

$$N \cdot \begin{bmatrix} A_1 e^{-i(\omega_c+\omega_1)(\tau_{a1}-\epsilon)} \\ A_2 e^{-i(\omega_c+\omega_2)(\tau_{a1}-\epsilon)} \\ \vdots \\ A_m e^{-i(\omega_c+\omega_m)(\tau_{a1}-\epsilon)} \end{bmatrix} + \sigma_A$$

In Equation 16, each of $Y_1, Y_2, \ldots Y_m$ denotes an inner product operation result between a sample vector and a DFT coefficient vector acquired according to Equation 15, and $\mathbb{Y}_A$ denotes a vector that includes $Y_1, Y_2, \ldots Y_m$. For example, $\mathbb{Y}_A$ may be referred to as a first phase vector. Also, $\sigma_A$ denotes an error vector.

Phases of components of the first phase vector $\mathbb{Y}_A$ may be proportional to a multiplication of $(\omega_c+\omega_k)$, which is a sum of an angular frequency of a carrier and an angular frequency of a subcarrier, and a propagation delay time $\tau_{a1}$. The UE 200 may acquire a plurality of first phase vectors by changing a start point t of a time interval.

The UE 200 may extract a phase vector of the second reference signal in a similar manner to a process of extracting a phase vector of the first reference signal, which is described above with reference to Equation 9 to Equation 16. A time interval in which the second reference signal is transmitted may differ from a time interval in which the first reference signal is transmitted. In this case, since orthogonality between the first reference signal and the second reference signal is guaranteed in the time domain, the first subcarrier group and the second subcarrier group may be the same. The following description is made based on an example in which the first reference signal and the second reference signal are transmitted in different time intervals and the first subcarrier group is the same as the second subcarrier group. However, it is provided as an example only. For example, although the first reference signal and the second reference signal are transmitted in different time intervals, the first subcarrier group and the second subcarrier group may be set to differ from each other. Also, the first reference signal and the second reference signal may be transmitted in the same time interval, and the first subcarrier group and the second subcarrier group may be set to differ from each other.

For example, a baseband of the second reference signal transmitted from the second transmitter 100B may be represented as Equation 17.

$$B_b(t-u) = \\ B_1 e^{i\omega_1(t-u)} + B_2 e^{i\omega_2(t-u)} + \ldots + B_m e^{i\omega_m(t-u)} = \sum_{q=1}^{m} B_q e^{i\omega_q(t-u)}$$

[Equation 17]

In Equation 17, $B_b(t-u)$ denotes a second reference signal transmitted in a baseband at a time $t-u$, and $B_q$ denotes an amplitude and an initial phase component of a subcarrier signal having an angular frequency $\omega_q$.

Compared to Equation 9, in Equation 17, an index of a baseband signal may be changed from a to b and a signal transmission time may be changed from t to t−u.

In a similar manner to a method of reaching Equation 16 from Equation 9, an equation that represents a phase vector of the second reference signal may be easily derived from Equation 17. For example, a phase vector of the second reference signal may be represented as Equation 18.

$$\mathbb{Y}_B = \begin{bmatrix} DFT_1(t-u-\epsilon) \\ DFT_2(t-u-\epsilon) \\ \vdots \\ DFT_m(t-u-\epsilon) \end{bmatrix} \cdot \begin{bmatrix} y_b(t-u) \\ y_b(t-u-1) \\ \vdots \\ y_b(t-u-N+1) \end{bmatrix} = \\ N \cdot \begin{bmatrix} B_1 e^{-i(\omega_c+\omega_1)(\tau_{b1}-\epsilon)} \\ B_2 e^{-i(\omega_c+\omega_2)(\tau_{b1}-\epsilon)} \\ \vdots \\ B_m e^{-i(\omega_c+\omega_m)(\tau_{b1}-\epsilon)} \end{bmatrix} + \sigma_B$$

[Equation 18]

In Equation 18, $\mathbb{Y}_B$ represents an inner product operation result between a sample vector of the second reference signal and a DFT coefficient vector. For example, $\mathbb{Y}_B$ may be referred to as a second phase vector. Also, $\sigma_B$ denotes an error vector, $\tau_{b1}$ denotes a propagation delay time of the second reference signal, and $\epsilon$ denotes an clock error between a clock of the UE 200 and a clock of the second transmitter 100B or a base station to which the second transmitter 100B belongs. If the first transmitter 100A and the second transmitter 100B use a clock of the same base station, the clock error represented in Equation 16 and the clock error represented in Equation 18 may be the same.

Phases of components of the second phase vector $\mathbb{Y}_B$ may be proportional to a multiplication of $(\omega_c+\omega_k)$, which is a sum of an angular frequency of a carrier and an angular frequency of a subcarrier, and a propagation delay time $\tau_{b1}$. The UE 200 may acquire a plurality of phase vectors with respect to the second reference signal by changing a start point t−u of a time interval.

In operation S130 of FIG. 3, the UE 200 may calculate a difference between a travel distance of the first reference signal and a travel distance of the second reference signal based on the first phase vector and the second phase vector. Hereinafter, a process of calculating, by the UE 200, the difference between the travel distance of the first reference signal and the travel distance of the and second reference signal is described as an example.

The UE 200 may calculate a conjugate multiplication of the first phase vector and the second phase vector. Through a process of calculating the conjugate multiplication, a factor depending on the local clock error $\epsilon$ may be removed. The conjugate multiplication of the first phase vector and the second phase vector may be represented as Equation 19.

$$\mathbb{Y}_A \mathbb{Y}_B^* = N \cdot \begin{bmatrix} A_1 e^{-i(\omega_c+\omega_1)(\tau_{a1}-\epsilon)} \\ A_2 e^{-i(\omega_c+\omega_2)(\tau_{a1}-\epsilon)} \\ \vdots \\ A_m e^{-i(\omega_c+\omega_m)(\tau_{a1}-\epsilon)} \end{bmatrix} \cdot N \cdot \begin{bmatrix} B_1^* e^{i(\omega_c+\omega_1)(\tau_{b1}-\epsilon)} \\ B_2^* e^{i(\omega_c+\omega_2)(\tau_{b1}-\epsilon)} \\ \vdots \\ B_m^* e^{i(\omega_c+\omega_m)(\tau_{b1}-\epsilon)} \end{bmatrix} = \\ N^2 \cdot \begin{bmatrix} A_1 B_1^* e^{i(\omega_c+\omega_1)\Delta\tau} \\ A_2 B_2^* e^{i(\omega_c+\omega_2)\Delta\tau} \\ \vdots \\ A_m B_m^* e^{i(\omega_c+\omega_m)\Delta\tau} \end{bmatrix},$$

[Equation 19]

$$\Delta\tau = \tau_{b1} - \tau_{a1}$$

In Equation 19, $_\Delta\tau$ denotes a difference between a delay time of the first reference signal and a delay time of the second reference signal. The UE 200 may derive the difference between the travel distance of the first reference signal and the travel distance of the second reference signal from $_\Delta\tau$. The UE 200 may calculate position coordinates of the UE 200 from the difference between the travel distance of the first reference signal and the travel distance of the second reference signal.

Referring to Equation 19, the conjugate multiplication of the first phase vector and the second phase vector may not depend on the local clock error $\epsilon$. Therefore, the UE 200 may derive position information of the UE 200 although information about the local clock error $\epsilon$ is absent. The conjugate multiplication of the first phase vector and the second phase vector may be represented as a vector, and a phase of each component of the conjugate multiplication may correspond to a multiplication of $(\omega_c+\omega_k)$, which is a sum of an angular frequency of a carrier and an angular frequency of a subcarrier, and $_\Delta\tau$, which is a difference between the delay time of the first reference signal and the delay time of the second reference signal.

The UE 200 may calculate a phase angle of each of components of the conjugate multiplication of two phase vectors. For example, the UE 200 may calculate a phase angle of each of components of the conjugate multiplication according to Equation 20.

$$\text{Angle}(\mathbb{Y}_A \mathbb{Y}_B^*) = \begin{bmatrix} \omega_c + \omega_1 \\ \omega_c + \omega_2 \\ \vdots \\ \omega_c + \omega_m \end{bmatrix} \Delta\tau$$

[Equation 20]

In Equation 20, Angle function denotes a function of outputting a phase angle of a complex component.

Referring to Equation 20, the UE 200 may calculate phase information Angle ($\mathbb{Y}_A \mathbb{Y}_B^*$) of the first phase vector and the second phase vector using the Angle function. Here, the phase information may include a term that depends on not only $\Delta\tau$ but also $\omega_c$. Therefore, a value of phase information may increase. In general, since an amplitude of an angular frequency $\omega_c$ of a carrier is significantly greater than that of an angular frequency of a subcarrier, $\Delta\tau$ may be easily accurately calculated from positioning phase information by allowing the phase information to depend on the angular frequency $\omega_c$ of the carrier, as represented as Equation 20.

In Equation 20, since a codomain of the Angle function is $-\pi \sim +\pi$ (or $0 \sim \pi$), an integer ambiguity issue may arise. Considering the integer ambiguity, Equation 20 may be represented again as Equation 21.

$$\text{Angle}(\Upsilon_A \Upsilon_B^*) + 2\pi \mathcal{M} = \begin{bmatrix} \omega_c + \omega_1 \\ \omega_c + \omega_2 \\ \vdots \\ \omega_c + \omega_m \end{bmatrix} \Delta\tau, \Delta\tau = \tau_{b1} - \tau_{a1} \quad \text{[Equation 21]}$$

In Equation 21, $\mathcal{M}$ denotes an integer ambiguity that occurs during a process of calculating a phase angle. Considering that an angular frequency $\omega_c$ of a carrier is generally greater than an angular frequency of a subcarrier, $\omega_c + \omega_k$ of Equation 20 may be approximated to $\omega_c$. In this case, the difference $_\Delta\tau$ between the delay time of the first reference signal and the delay time of the second reference signal from Equation 21 may be represented as Equation 22.

$$\Delta\tau \approx (\text{average}[\text{Angle}(\Upsilon_A \Upsilon_B^*)] + 2\pi\mathcal{M})/\omega_c \quad \text{[Equation 22]}$$

The UE 200 may calculate an average of phase angles of components of a conjugate multiplication vector. Here, $_\Delta\tau$ may depend on the average and a factor by the integer ambiguity.

By performing an operation process of Equation 21 and Equation 22, the UE 200 may calculate the difference between the delay time of the first reference signal and the delay time of the second reference signal from the conjugate multiplication of the first phase vector and the second phase vector.

For example, the UE 200 may calculate a difference between a travel distance of the first reference signal and a travel distance of the second reference signal from the difference $_\Delta\tau$ between the delay times according to Equation 23.

$$\Delta d = \Delta\tau \cdot c \approx \left( \frac{\text{average}[\text{Angle}(\Upsilon_A \Upsilon_B^*)]}{2\pi} + \mathcal{M} \right) \cdot \lambda_c \quad \text{[Equation 23]}$$

In Equation 23, $\Delta d$ denotes the difference between the travel distance of the first reference signal and the travel distance of the second reference signal, and $\lambda_c$ denotes a wavelength of a carrier (also, referred to as a carrier wavelength). For example, if the first transmitter 100A and the second transmitter 100B transmit the first reference signal and the second reference signal through modulation to a carrier frequency of 1 GHz, $\lambda_c$ may be 30 cm. Here, c denotes a light velocity.

Referring to Equation 23, the UE 200 may calculate $\Delta d$ from the conjugate multiplication, and $\Delta d$ may be proportional to the carrier wavelength $\lambda_c$.

In Equation 23, since the integer ambiguity $\mathcal{M}$ is still not determined, it may not be easy for the UE 200 to accurately calculate the distance difference $\Delta d$. Among various carrier phase-based positioning methods of a GPS, for example, the Least-squares AMBiguity Decorrelation Adjustment (LAMBDA) method and the widelane method are known as a method of accurately estimating an integer ambiguity value. A method of estimating an integer ambiguity using signals transmitted from at least three transmitters is further described below.

A case in which the first reference signal and the second reference signal are transmitted in different time domains and the first subcarrier group and the second subcarrier group are the same is described. However, if the first reference signal and the second reference signal are transmitted in the same time domain, the first subcarrier group and the second subcarrier group may be set to differ from each other. The following equations are described generally based on a case in which the first reference signal and second reference signal are transmitted in the same time domain and the first subcarrier group and the second subcarrier group are set to differ from each other, however, it is provided as an example only for clarity of description. Although the first reference signal and the second reference signal are transmitted in the same time domain, the first subcarrier group and the second subcarrier group may be set to differ from each other. Hereinafter, a method of calculating, by the UE 200, the difference between the travel distance of the first reference signal and the travel distance of the second reference signal when the first subcarrier group and the second subcarrier group differ from each other is described. For clarity of description, it is assumed that a process of acquiring, by the UE 200, the first phase vector is the same as Equation 9 to Equation 16. However, it is provided as an example only for clarity of description and the example embodiment may be modified by those skilled in the art within the scope of the disclosure.

For example, if subcarriers having a conjugate relation with subcarriers of the first subcarrier group are allocated to the second subcarrier group, the first subcarrier group and the second subcarrier group may be orthogonal to each other. For example, if the first subcarrier group includes subcarriers having angular frequencies $\omega_1 \sim \omega_m$, the second subcarrier group may include subcarriers having angular frequencies $\omega_{N-1} \sim \omega_{N-m}$. Here, N denotes a size of an FFT window in the OFDM system. As described above, if the first subcarrier group and the second subcarrier group are set, a frequency magnitude of a subcarrier component of the first reference signal and a frequency magnitude of a subcarrier component of the second reference signal may be the same, however, a sign of an imaginary part of the subcarrier component of the first reference signal may be opposite to a sign of an imaginary part of the subcarrier component of the second reference signal. That is, the subcarrier component of the first reference signal and the subcarrier component of the second reference signal may have a conjugate relation.

The conjugate relation may be represented as Equation 24.

$$e^{i\omega_{N-k}} = e^{-i\omega_k}, N = \text{size of FFT window} \quad \text{[Equation 24]}$$

For example, if a time at which the second reference signal is set to be the same as a time t at which the first reference signal is transmitted, the second reference signal of the baseband transmitted from the second transmitter 100B may be represented as Equation 25.

The development process of the following equations are similar to the aforementioned development process of Equation 9 to Equation 16. Therefore, the description of notations that are not required among notations included in the equations may be omitted.

$$B_b(t) = \quad \text{[Equation 25]}$$
$$B_1 e^{i\omega_{N-1} t} + B_2 e^{i\omega_{N-2} t} + \ldots + B_m e^{i\omega_{N-m} t} = \sum_{q=1}^{m} B_q e^{i\omega_{N-q} t}$$

The second transmitter 100B may modulate the second reference signal of the baseband to a passband signal having an angular frequency $\omega_c$ and may transmit the modulated second reference signal. The modulated second reference signal may be represented as Equation 26.

$$S_b(t) = B_b(t) \cdot e^{i\omega_c t} = \quad \text{[Equation 26]}$$
$$\left( B_1 e^{i\omega_{N-1} t} + B_2 e^{i\omega_{N-2} t} + \ldots + B_m e^{i\omega_{N-m} t} \right) \cdot e^{i\omega_c t} =$$
$$\sum_{q=1}^{m} B_q e^{i(\omega_c + \omega_{N-q}) t}$$

If the second reference signal transmitted from the second transmitter 100B arrives at the UE 200 through propagation during $\tau_{b1}$ and, the second reference signal received at the UE 200 may be represented as Equation 27.

$$S_b(t - \tau_{b1}) = \quad \text{[Equation 27]}$$
$$\sum_{q=1}^{m} B_q e^{i(\omega_c + \omega_{N-q})(t - \tau_{b1})} = e^{i\omega_c(t - \tau_{b1})} \sum_{q=1}^{m} B_q e^{i\omega_{N-q}(t - \tau_{b1})}$$

The UE 200 may demodulate the received second reference signal of the passband to a baseband signal. For example, the UE 200 may demodulate the second reference signal to the baseband signal using Equation 28.

$$y_b(t) = e^{-i\omega_c(t - \epsilon)} \cdot S_b(t - \tau_{b1}) = e^{-i\omega_c(\tau_{b1} - \epsilon)} \cdot \sum_{q=1}^{m} B_q e^{i\omega_{N-q}(t - \tau_{b1})} \quad \text{[Equation 28]}$$

In Equation 28, $\epsilon$ denotes a local clock error. The UE 200 may acquire a second sample vector by converting second reference signals received at a plurality of points in times to baseband signals. For example, the UE 200 may acquire the second sample vector according to Equation 29.

$$Y_b(t) = \begin{bmatrix} y_b(t) \\ y_b(t-1) \\ \vdots \\ y_b(t - N + 1) \end{bmatrix} \quad \text{[Equation 29]}$$

In Equation 29, $Y_b(t)$ denotes a second sample vector that includes samples of second reference signal received at N sample times. The UE 200 may calculate a DFT coefficient vector used for an FFT operation of a subcarrier having an angular frequency $\omega_{N-k}$ according to Equation 30.

$$DFT_{N-k}(t-\epsilon) = [e^{i\omega_{N-k}(t-\epsilon)} e^{i\omega_{N-k}(t-1-\epsilon)} e^{i\omega_{N-k}(t-2-\epsilon)} \ldots e^{i\omega_{N-k}(t-N+1-\epsilon)}] \quad \text{[Equation 30]}$$

The UE 200 may perform an inner product operation on the second sample vector of Equation 29 and the DFT coefficient vector of Equation 30, using Equation 31.

$$Y_k = DFT_{N-k}(t - \epsilon) \cdot \begin{bmatrix} y_b(t) \\ y_b(t-1) \\ \vdots \\ y_b(t - N + 1) \end{bmatrix} = \quad \text{[Equation 31]}$$

$$\sum_{n=0}^{N-1} y_b(t-n) e^{-i\omega_{N-k}(t-n-\epsilon)} = N \cdot B_k e^{-i(\omega_c + \omega_{N-k})(\tau_{b1} - \epsilon)} + \sigma_b$$

$$\sigma_b = \sum_{n=0}^{N-1} \sum_{q=1}^{m, q \neq k} B_q e^{i((\omega_q - \omega_{N-k})(t-n) - \omega_q \tau_{b1} + \omega_{N-k} \epsilon)} \approx 0$$

In the aforementioned description, only the subcarrier signal having the angular frequency $\omega_{N-k}$ is considered. If the second subcarrier group of the second reference signal includes a subcarrier group having angular frequencies $\omega_{N-1} \sim \omega_{N-m}$, Equation 31 may be normalized as represented as Equation 32.

$$\Psi_B = \begin{bmatrix} DFT_{N-1}(t - \epsilon) \\ DFT_{N-2}(t - \epsilon) \\ \vdots \\ DFT_{N-m}(t - \epsilon) \end{bmatrix} \cdot \begin{bmatrix} y_b(t) \\ y_b(t-1) \\ \vdots \\ y_b(t - N + 1) \end{bmatrix} = \quad \text{[Equation 32]}$$

$$N \cdot \begin{bmatrix} B_1 e^{-i(\omega_c + \omega_{N-1})(\tau_{b1} - \epsilon)} \\ B_2 e^{-i(\omega_c + \omega_{N-2})(\tau_{b1} - \epsilon)} \\ \vdots \\ B_m e^{-i(\omega_c + \omega_{N-m})(\tau_{b1} - \epsilon)} \end{bmatrix} + \sigma_B$$

Referring to Equation 32, phases of components of the second phase vector $\Psi_B$ may include a factor that is proportional to a multiplication of $(\omega_c + \omega_{N-k})$, which is a sum of an angular frequency of a carrier and an angular frequency of a subcarrier, and a propagation delay time $\tau_{b1}$. The UE 200 may calculate a conjugate multiplication of the first phase vector represented in Equation 16 and the second phase vector represented in Equation 32. The conjugate multiplication of the first phase vector and the second phase vector may be represented as Equation 33.

$$\Psi_A \Psi_B^* = N \cdot \begin{bmatrix} A_1 e^{-i(\omega_c + \omega_1)(\tau_{a1} - \epsilon)} \\ A_2 e^{-i(\omega_c + \omega_2)(\tau_{a1} - \epsilon)} \\ \vdots \\ A_m e^{-i(\omega_c + \omega_m)(\tau_{a1} - \epsilon)} \end{bmatrix} \cdot N \cdot \begin{bmatrix} B_1^* e^{i(\omega_c + \omega_{N-1})(\tau_{b1} - \epsilon)} \\ B_2^* e^{i(\omega_c + \omega_{N-2})(\tau_{b1} - \epsilon)} \\ \vdots \\ B_m^* e^{i(\omega_c + \omega_{N-m})(\tau_{b1} - \epsilon)} \end{bmatrix} \quad \text{[Equation 33]}$$

Based on $e^{i\omega_{N-k}} = e^{-i\omega_k}$, Equation 33 may be represented as Equation 34.

$$\Psi_A \Psi_B^* = N \cdot \begin{bmatrix} A_1 e^{-i(\omega_c \omega_1)(\tau_{a1} - \epsilon)} \\ A_2 e^{-i(\omega_c \omega_2)(\tau_{a1} - \epsilon)} \\ \vdots \\ A_m e^{-i(\omega_c \omega_m)(\tau_{a1} - \epsilon)} \end{bmatrix} \cdot N \cdot \begin{bmatrix} B_1^* e^{i(\omega_c - \omega_1)(\tau_{b1} - \epsilon)} \\ B_2^* e^{i(\omega_c - \omega_2)(\tau_{b1} - \epsilon)} \\ \vdots \\ B_m^* e^{i(\omega_c - \omega_m)(\tau_{b1} - \epsilon)} \end{bmatrix} = \quad \text{[Equation 34]}$$

$$N^2 \cdot \begin{bmatrix} A_1 B_1^* e^{-i(\omega_c \Delta\tau - \omega_1 \Delta\upsilon)} \\ A_2 B_2^* e^{-i(\omega_c \Delta\tau - \omega_2 \Delta\upsilon)} \\ \vdots \\ A_m B_m^* e^{-i(\omega_c \Delta\tau - \omega_m \Delta\upsilon)} \end{bmatrix},$$

$$\Delta\tau = \tau_{b1} - \tau_{a1}, \ \Delta\upsilon = \tau_{b1} + \tau_{a1} - 2\epsilon$$

If the first subcarrier group and the second subcarrier group are the same, the conjugate multiplication of two phase vectors may depend on the clock error ϵ as shown in Equation 19. However, if the first subcarrier group and the second subcarrier group differ from each other, the conjugate multiplication of two phase vectors may depend on the clock error ϵ as shown in Equation 34.

The UE 200 may calculate a phase angle of each of components of the conjugate multiplication of two phase vectors. For example, the UE 200 may calculate a phase angle of each of components of the conjugate multiplication according to Equation 35.

$$\text{Angle}(Y_A Y_B^*) + 2\pi \mathcal{M} = \begin{bmatrix} \theta_{c1} \\ \theta_{c2} \\ \vdots \\ \theta_{cm} \end{bmatrix} + 2\pi \mathcal{M} = \omega_c \Delta\tau - \begin{bmatrix} \omega_1 \\ \omega_2 \\ \vdots \\ \omega_m \end{bmatrix} \Delta\upsilon \quad \text{[Equation 35]}$$

$$\Delta\tau = \tau_{b1} - \tau_{a1}, \Delta\upsilon = \tau_{b1} + \tau_{a1} - 2\epsilon$$

In Equation 35, $[\theta_{c1}, \theta_{c2}, \ldots \theta_{cm}]^T$ denotes an output result of Angle function. Since a codomain of the Angle function includes $-\pi \sim +\pi$ (or $0 \sim 2\pi$), it may be difficult to know the integer ambiguity $\mathcal{M}$. Also, in Equation 35, $\Delta\upsilon$ depends on the local clock error $\epsilon$. Here, it may be difficult for the UE 200 to secure information about the local clock error $\epsilon$. Therefore, the UE 200 may calculate a parameter that does not depend on the local clock error $\epsilon$ by combining the respective components of an output vector of the Angle function. For example, the UE 200 may calculate a vector that includes difference values between phase angle components using Equation 36.

$$\begin{bmatrix} \theta_{c2} - \theta_{c1} \\ \theta_{c3} - \theta_{c2} \\ \vdots \\ \theta_{cm} - \theta_{cm-1} \end{bmatrix} = \begin{bmatrix} \omega_2 \Delta\upsilon - \omega_1 \Delta\upsilon \\ \omega_3 \Delta\upsilon - \omega_2 \Delta\upsilon \\ \vdots \\ \omega_m \Delta\upsilon - \omega_{m-1} \Delta\upsilon \end{bmatrix} = \begin{bmatrix} \omega_1 \Delta\upsilon \\ \omega_1 \Delta\upsilon \\ \vdots \\ \omega_1 \Delta\upsilon \end{bmatrix} \quad \text{[Equation 36]}$$

If subcarriers of the first subcarrier group are provided at equal intervals in the frequency domain and subcarriers of the second subcarrier group are provided at equal intervals in the frequency domain, all of components shown in Equation 36 may have the same value. In Equation 36, with the assumption that all of $\omega_2, \omega_3, \ldots$ are multiples of $\omega_1$, $\omega_{k+1} - \omega_k = \omega_1$. However, it is provided as an example only. A value of $\omega_{k+1} - \omega_k$ may not be equal to $\omega_1$. Here, if subcarriers are provided at equal intervals in the frequency domain, a value of $\omega_{k+1} - \omega_k$ may be constant regardless of a value of k. In this case, all of vector components shown in Equation 36 may have the same value.

The UE 200 may calculate $\Delta\upsilon$ according to Equation 37.

$$\text{average}\begin{bmatrix} \theta_{c2} - \theta_{c1} \\ \theta_{c3} - \theta_{c2} \\ \vdots \\ \theta_{cm} - \theta_{cm-1} \end{bmatrix} = \quad \text{[Equation 37]}$$

$$\text{sum}\begin{bmatrix} \theta_{c2} - \theta_{c1} \\ \theta_{c3} - \theta_{c2} \\ \vdots \\ \theta_{cm} - \theta_{cm-1} \end{bmatrix} / (m-1) = \frac{\theta_{cm} - \theta_{c1}}{m-1} = \omega_1 \Delta\upsilon$$

Referring to Equation 34 and Equation 37, although $\Delta\upsilon$ depends on $\epsilon$, the UE 200 may calculate $\Delta\upsilon$ according to Equation 37 without using information about $\epsilon$.

Using the result of Equation 37, Equation 35 may be represented as Equation 38.

$$\text{Angle}(Y_A Y_B^*) + 2\pi\mathcal{M} = \omega_c \Delta\tau - \begin{bmatrix} \omega_1 \\ \omega_2 \\ \vdots \\ \omega_m \end{bmatrix} \Delta\upsilon = \omega_c \Delta\tau - \kappa, \quad \text{[Equation 38]}$$

$$\kappa = \begin{bmatrix} 1 \\ 2 \\ \vdots \\ m \end{bmatrix} \cdot \frac{\theta_{cm} - \theta_{c1}}{m-1}$$

In Equation 38, m denotes a number of components of conjugate multiplication vector $Y_A Y_B^*$, $\mathcal{M}$ denotes the integer ambiguity, and $\kappa$ denotes a parameter that represents $$\begin{bmatrix} \omega_1 \\ \omega_2 \\ \vdots \\ \omega_m \end{bmatrix} \Delta\upsilon$$

in a form not depending on the local clock error $\epsilon$. Also, $(\theta_{cm} - \theta_{c1})$ denotes a difference between a last component and a first component of an output vector of the angle function. If $(\theta_{cm} - \theta_{c1})$ converges to 0, $\kappa$ may be ignored.

The UE 200 may calculate a difference between a delay time of the first reference signal and a delay time of the second reference signal according to Equation 39.

$$\Delta\tau \approx (\text{average}[\text{Angle}(Y_A Y_B^*) + \kappa] + 2\pi\mathcal{M})/\omega_c, \quad \text{[Equation 39]}$$

$$\kappa = \begin{bmatrix} 1 \\ 2 \\ \vdots \\ m \end{bmatrix} \cdot \frac{\theta_{cm} - \theta_{c1}}{m-1}$$

Referring to Equation 33 to Equation 39, if the first subcarrier group and the second subcarrier group differ from each other, the conjugate multiplication of two phase vectors may depend on the local clock error $\epsilon$. However, if subcarriers of the first subcarrier group and subcarriers of the second subcarrier group are provided at equal intervals in the frequency domain, the UE 200 may calculate the difference between the delay time of the first reference signal and the delay time of the second reference signal from the conjugate multiplication of two phase vectors without using information about the local clock error $\epsilon$.

The UE 200 may calculate a difference between a travel distance of the first reference signal and a travel distance of the second reference signal according to Equation 40.

$$\Delta d = \Delta\tau \cdot c \approx (\text{average}[\text{Angle}(Y_A Y_B^*) + \kappa]/2\pi + \mathcal{M}) \cdot \lambda_c \quad \text{[Equation 40]}$$

In the aforementioned description, if the first subcarrier group and the second subcarrier group are the same, the UE 200 may calculate the difference between the travel distance of the first reference signal and the travel distance of the second reference signal according to Equation 23. As another example, if the first subcarrier group and the second subcarrier group differ from each other, the UE 200 may calculate the difference between the travel distance of the first reference signal and the travel distance of the second reference signal according to Equation 40.

A case in which subcarrier components of the second subcarrier group and subcarrier components of the first subcarrier group have a conjugate relation is described with reference to Equation 24 to Equation 40. However, it is provided as an example only. For example, the second subcarrier group may be spaced apart at a desired distance d from the first subcarrier group in the frequency domain. The distance d may variously vary based on a scheduling condition.

In the condition, the second phase vector shown Equation 32 may reappear in Equation 41.

$$\Upsilon_B(t) = \begin{bmatrix} DFT_{d+1}(t-\epsilon) \\ DFT_{d+2}(t-\epsilon) \\ \vdots \\ DFT_{d+m}(t-\epsilon) \end{bmatrix} \cdot \begin{bmatrix} x_b(t) \\ x_b(t-1) \\ \vdots \\ x_b(t-N+1) \end{bmatrix} = \qquad \text{[Equation 41]}$$

$$N \cdot \begin{bmatrix} B_1 e^{-i((\omega_c+\omega_{d+1})(\tau_{b1}-\epsilon)} \\ B_2 e^{-i((\omega_c+\omega_{d+2})(\tau_{b1}-\epsilon)} \\ \vdots \\ B_m e^{-i((\omega_c+\omega_{d+m})(\tau_{b1}-\epsilon)} \end{bmatrix} + \sigma_B$$

In Equation 41, d denotes a difference in angular frequency index between the first subcarrier group and the second subcarrier group in the frequency domain.

Referring to Equation 41, the first subcarrier group may include subcarrier components having angular frequencies $\omega_1 \sim \omega_m$, and the second subcarrier group may include subcarrier components having angular frequencies to $\omega_{d+1} \sim \omega_{d+m}$ separate at the distance d from the first subcarrier group in the frequency domain.

By applying Equation 41, Equation 33 may reappear as shown in Equation 42.

$$\Upsilon_A \Upsilon_B^* = N \cdot \begin{bmatrix} A_1 e^{-i(\omega_c+\omega_1)(\tau_{a1}-\epsilon)} \\ A_2 e^{-i(\omega_c+\omega_2)(\tau_{a1}-\epsilon)} \\ \vdots \\ A_m e^{-i(\omega_c+\omega_m)(\tau_{a1}-\epsilon)} \end{bmatrix} \cdot N \cdot \begin{bmatrix} B_1^* e^{i(\omega_c+\omega_{d+1})(\tau_{b1}-\epsilon)} \\ B_2^* e^{i(\omega_c+\omega_{d+2})(\tau_{b1}-\epsilon)} \\ \vdots \\ B_m^* e^{i(\omega_c+\omega_{d+m})(\tau_{b1}-\epsilon)} \end{bmatrix} =$$

$$N^2 \cdot \begin{bmatrix} A_1 B_1^* e^{-i(\omega_c+\omega_1)\Delta\tau} \\ A_2 B_2^* e^{-i(\omega_c+\omega_2)\Delta\tau} \\ \vdots \\ A_m B_m^* e^{-i(\omega_c+\omega_m)\Delta\tau} \end{bmatrix} e^{i\omega_d(\tau_{b1}-\epsilon)},$$

$$\Delta\tau = \tau_{b1} - \tau_{a1}$$

In Equation 42, $e^{i\omega_d(\tau_{b1}-\epsilon)}$ may depend on the local clock error $\epsilon$. The UE 200 may multiply the matrix $\Upsilon_A \Upsilon_B^*$ by a correction factor to calculate a difference in time of arrival (ToA) between the first reference signal and the second reference signal without using information about the local clock error $\epsilon$.

To multiply the correction factor, the UE 200 may extract, from the second phase vector, a desired number of components having a relatively small angular frequency index and a desired number of components having a relatively high angular frequency index. For example, the UE 200 may extract, from the second phase vector, a low vector having (m−1) components with a relatively low angular frequency index and a high vector having (m−1) components with a relatively high angular frequency index according to Equation 43.

$$\text{Low}(\Upsilon_B(t)) = \begin{bmatrix} B_1 e^{-i((\omega_c+\omega_{d+1})(\tau_{b1}-\epsilon)} \\ B_2 e^{-i((\omega_c+\omega_{d+2})(\tau_{b1}-\epsilon)} \\ \vdots \\ B_{m-1} e^{-i((\omega_c+\omega_{d+m-1})(\tau_{b1}-\epsilon)} \end{bmatrix} \qquad \text{[Equation 43]}$$

$$\text{High}(\Upsilon_B(t)) = \begin{bmatrix} B_2 e^{-i((\omega_c+\omega_{d+2})(\tau_{b1}-\epsilon)} \\ B_3 e^{-i((\omega_c+\omega_{d+3})(\tau_{b1}-\epsilon)} \\ \vdots \\ B_m e^{-i((\omega_c+\omega_{d+m})(\tau_{b1}-\epsilon)} \end{bmatrix}$$

The UE 200 may calculate a conjugate multiplication of the low vector and the high vector according to Equation 44.

$$\text{Low}(\Upsilon_B(t)) \cdot \text{conj}(\text{High}(\Upsilon_B(t))) = \begin{bmatrix} B_1 e^{-i((\omega_c+\omega_{d+1})(\tau_{b1}-\epsilon)} \\ B_2 e^{-i((\omega_c+\omega_{d+2})(\tau_{b1}-\epsilon)} \\ \vdots \\ B_m e^{-i((\omega_c+\omega_{d+m-1})(\tau_{b1}-\epsilon)} \end{bmatrix} \cdot \qquad \text{[Equation 44]}$$

$$\begin{bmatrix} B_2 e^{-i((\omega_c+\omega_{d+2})(\tau_{b1}-\epsilon)} \\ B_3 e^{-i((\omega_c+\omega_{d+3})(\tau_{b1}-\epsilon)} \\ \vdots \\ B_m e^{-i((\omega_c+\omega_{d+m})(\tau_{b1}-\epsilon)} \end{bmatrix} = \begin{bmatrix} B_1 B_2^* \\ B_2 B_3^* \\ \vdots \\ B_{m-1} B_m^* \end{bmatrix} e^{i\omega_1(\tau_{b1}-\epsilon)}$$

Referring to Equation 44, it can be known that a phase angle of each component is the same as $\omega_1(\tau_{b1}-\epsilon)$ in the conjugate multiplication of the low vector and the high vector. Therefore, all $\omega_1(\tau_{b1}-\epsilon)$ may have a difference from the phase angle $\omega_d(\tau_{b1}-\epsilon)$ depending on the local clock error by multiples of d in Equation 42. That is, the UE 200 may extract the correction factor based on information about phase angles of components of the conjugate multiplication of the low vector and the high vector.

Equation 43 and Equation 44 show, as an example, that an angular frequency index between the components of the low vector and the components of the high vector differs by 1. However, it is provided as an example only. For example, an angular frequency index between the components of the low vector and the components of the high vector may differ by 2 or more. Also, although, in Equation 43, each of the low vector and the high vector includes (m−1) vectors, it is provided as an example only and the example embodiment is not limited thereto. Each of the low vector and the high vector may include a number of components greater than or less than m−1. For example, the UE 200 may extract information about a value of the phase angle $\omega_1(\tau_{b1}-\epsilon)$ from the second phase vector, using only a conjugate multiplication of a first component (e.g., $B_1 e^{-i((\omega_c+\omega_{d+1})(\tau_{b1}-\epsilon))}$) having a relatively small angular frequency index and a second component (e.g., $B_1 e^{-i((\omega_c+\omega_{d+1})(\tau_{b2}-\epsilon))}$) having a relatively high angular frequency index.

The UE 200 may remove the dependence on the local clock error by multiplying the conjugate multiplication of the first phase vector and the second phase vector by the correction factor. The UE 200 may calculate the difference in ToA between the first reference signal and the second reference signal from the conjugate multiplication multiplied by the correction factor. For example, the UE 200 may calculate the difference in ToA between the first reference signal and the second reference signal according to Equation 45.

$$\text{angle}\left(\mathbb{Y}_A \mathbb{Y}_B^* \cdot e^{-iK}\right) = \begin{bmatrix} \omega_c + \omega_1 \\ \omega_c + \omega_2 \\ \vdots \\ \omega_c + \omega_m \end{bmatrix} \Delta \tau, \quad \text{[Equation 45]}$$

$$K = d \cdot \text{angle}(\text{Low}(\mathbb{Y}_B(t)) \cdot \text{conj}(\text{High}(\mathbb{Y}_B(t))))$$

Referring to Equation 45, as the UE 200 multiplies the conjugate multiplication by the correction factor, $\mathbb{Y}_A \mathbb{Y}_B^* \cdot e^{-iK}$ may not depend on the local clock error. Therefore, the UE 200 may acquire information about the difference in ToA between the first reference signal and the second reference signal by extracting phase angles of components of $\mathbb{Y}_A \mathbb{Y}_B^* \cdot e^{-iK}$.

If the integer ambiguity $\mathcal{M}$ is not determined in Equation 23 and Equation 40, it may be difficult for the UE 200 to calculate a distance difference. Hereinafter, an integer ambiguity estimation method is described as an example. In Equation 23 and Equation 40, average[Angle $(\mathbb{Y}_A \mathbb{Y}_B^*)]/2\pi$ may have a value between −0.5 and 0.5. Therefore, if a value of κ is small, the UE 200 may calculate the integer ambiguity $\mathcal{M}$ according to Equation 46.

$$\mathcal{M} = \left\lceil \frac{\Delta d}{\lambda_c} \right\rceil \quad \text{[Equation 46]}$$

Figure 8:
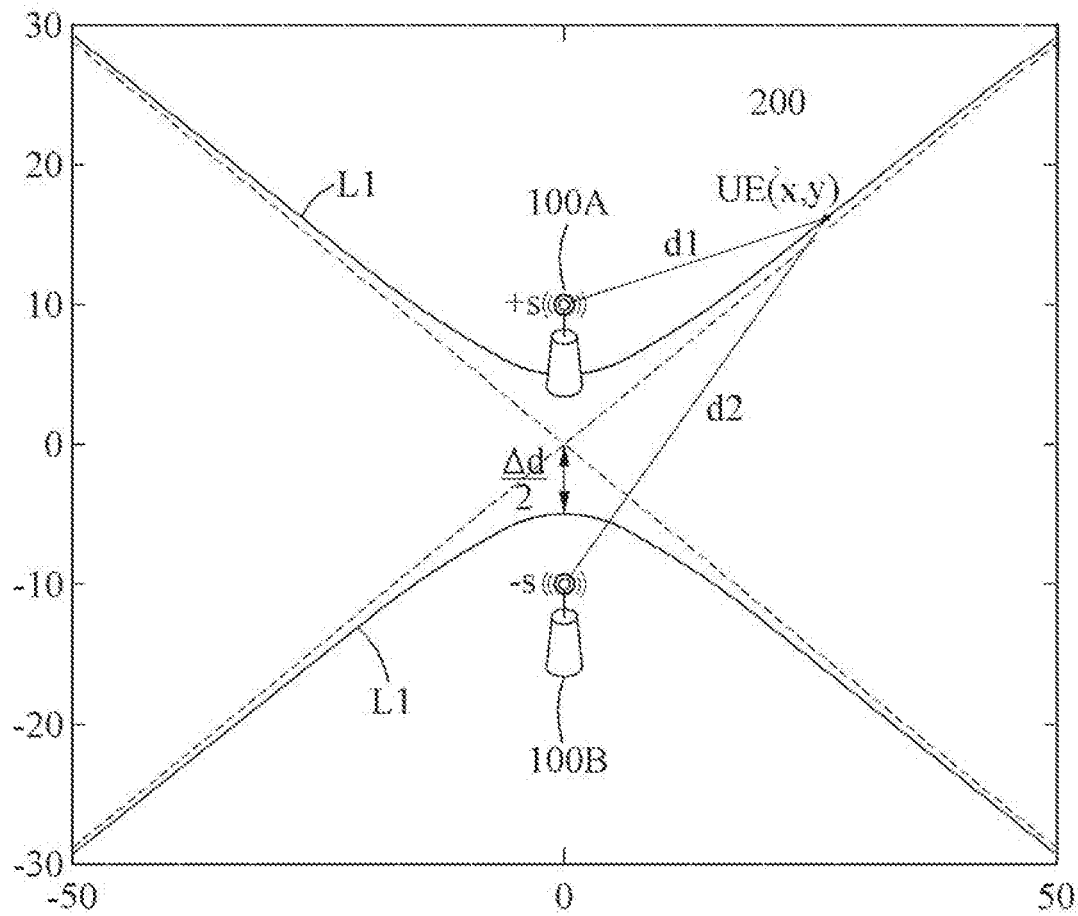
FIG. 8 illustrates an example of a trace of dots having Δd that is a difference between a distance from a first transmitter and a distance from a second transmitter according to at least one example embodiment.

FIG. 8 illustrates an example of traces of dots having a difference Δd between a distance from the first transmitter 100A and a distance from the second transmitter 100B according to at least one example embodiment. Referring to FIG. 8, a hyperbola, that is, hyperbolic curves may be formed using traces of dots having the difference Δd between the distance from the first transmitter 100A and the distance from the second transmitter 100B.

In FIG. 8, coordinates of the first transmitter 100A may be (0, +s), coordinates of the second transmitter 100B may be (0, −s), coordinates of the UE 200 may be (x, y), and coordinates of a center point between the first transmitter 100A and the second transmitter 100B may be (0,0). The first transmitter 100A and the second transmitter 100B may be separate from each other at 2s in a y-axial direction.

Hyperbolic curves L1 may pass (0, $_{+\Delta}$d/2) and (0, $_{-\Delta}$d/2). Two coordinates (0, $_{+\Delta}$d/2) and (0, −Δd/2) at which the hyperbolic curves L1 meet the y axis may correspond to vertices. Referring to the hyperbolic curves L1 of FIG. 8, Equation 47 may be satisfied.

$$\Delta d < |2s| \quad \text{[Equation 47]}$$

Equation 48 may be derived from Equation 46 and Equation 47.

$$\mathcal{M} = \left\lceil \frac{\Delta d}{\lambda_c} \right\rceil < \left\lceil \frac{2s}{\lambda_c} \right\rceil \quad \text{[Equation 48]}$$

Referring to Equation 48, the integer ambiguity $\mathcal{M}$ may not be greater than an integer acquired by dividing the distance 2s between the first transmitter 100A and the second transmitter 100B by carrier wavelength $\lambda_c$. Therefore, if the first transmitter 100A and the second transmitter 100B are arranged such that the distance 2s between the first transmitter 100A and the second transmitter 100B may be less than the carrier wavelength $\lambda_c$, $\mathcal{M}=0$.. That is, in this case, the integer ambiguity issue may be solved. Therefore, the UE 200 may calculate a difference between a travel distance of a first reference signal and a travel distance of a second reference signal according to Equation 23 or Equation 40.

As shown in FIG. 8, if the distance between the first transmitter 100A and the second transmitter 100B is sufficiently short, the integer ambiguity issue may be solved. In contrast, since coordinates of the UE 200 vary, a difference between a distance d1 and a distance d2, that is, d1−d2 may vary by a small level. Therefore, a level that an error of a calculation result of the UE 200 using Equation 23 or Equation 40 contributes to a positioning error may increase and a positioning resolution may decrease.

To outperform the aforementioned issue, the UE 200 may receive reference signals from at least three transmitters.

Figure 9:
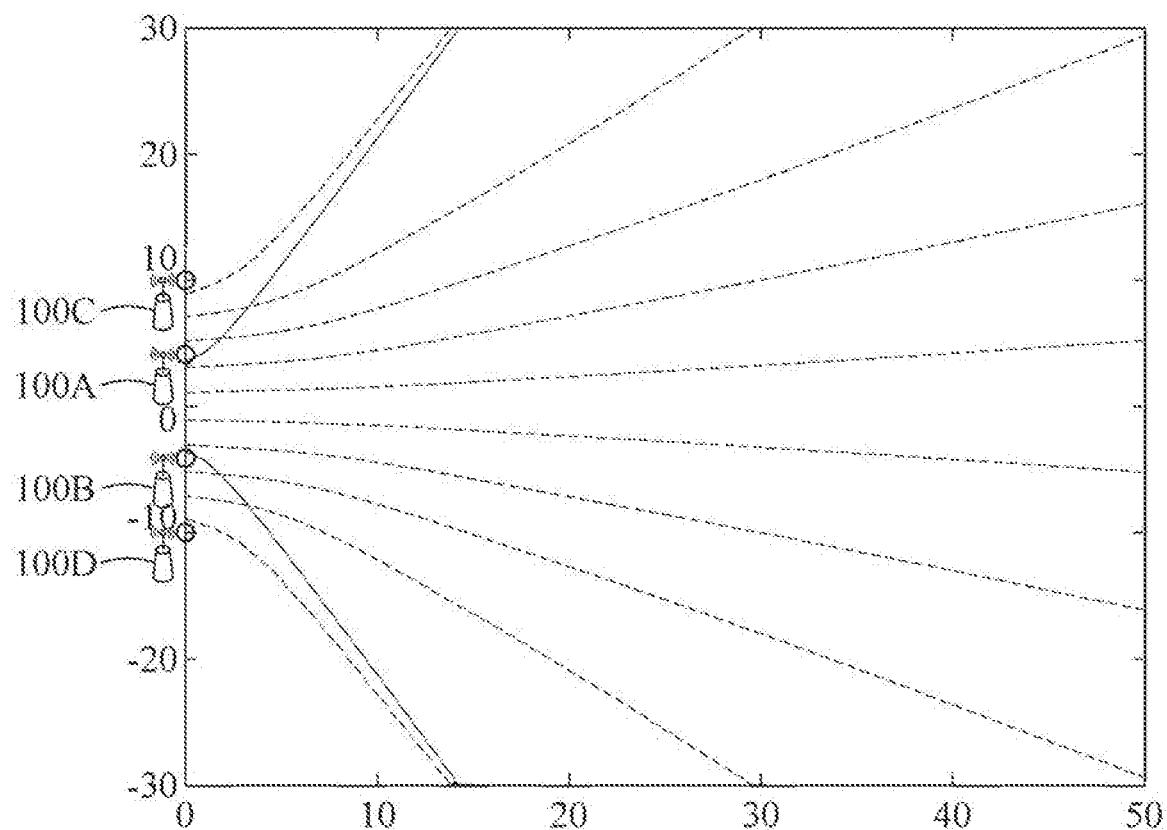
FIG. 9 is a graph showing an example in which four transmitters transmit reference signals according to at least one example embodiment.

FIG. 9 is a graph showing an example in which four transmitters including the first transmitter 100A, the second transmitter 100B, a third transmitter 100C, and a fourth transmitter 100D, transmit reference signals according to at least one example embodiment.

Referring to FIG. 9, the first transmitter 100A may transmit a first reference signal, the second transmitter 100B may transmit a second reference signal, the third transmitter 100C may transmit a third reference signal, and the fourth transmitter 100D may transmit a fourth reference signal. A distance between the first transmitter 100A and the second transmitter 100B may be less than a distance between the third transmitter 100C and the fourth transmitter 100D. Referring to FIG. 9, the distance between the first transmitter 100A and the second transmitter 100B may be less than a carrier wavelength. The distance between the third transmitter 100C and the fourth transmitter 100D may be greater than the carrier wavelength.

The UE 200 may calculate phase information, for example, average[Angle ($\mathbb{Y}_A \mathbb{Y}_B^*$)+κ] of Equation 40, using a sample vector of the reference signal and a sample vector of the fourth reference signal. In this case, since the phase information sensitively varies according to coordinates of the UE 200, a positioning resolution may increase. However, in this case, an integer ambiguity issue may remain unsolved.

The UE 200 may calculate phase information based on a sample vector of the first reference signal and a sample vector of the second reference signal. In this case, since the phase information insensitively varies according to coordinates of the UE 200, the positioning resolution may decrease. However, in this case, the integer ambiguity issue may not arise.

The UE 200 may estimate the integer ambiguity of second phase information acquired from the third reference signal and the fourth reference signal based on first phase information acquired from the first reference signal and the second reference signal. Referring to FIG. 9, a plurality of hyperbolic curves may be formed by focusing on the third transmitter 100C and the fourth transmitter 100D. Each of the hyperbolic curves may correspond to different integer ambiguity. The UE 200 may estimate an appropriate position of the UE 200 based on the first phase information. The UE 200 may estimate the integer ambiguity from approximate position information.

Hereinafter, a method of estimating, by the UE 200, the integer ambiguity of the second phase information from the first phase information is described.

For example, with the assumption that the distance between the first transmitter 100A and the second transmitter 100B is less than the carrier wavelength $\lambda_c$ and the distance between the third transmitter 100C and the fourth transmitter 100D corresponds to M multiples of the carrier wavelength $\lambda_c$, the integer ambiguity of the first phase information acquired by the UE 200 may be 0 at all times. Also, referring to Equation 43, the integer ambiguity of the second phase information acquired by the UE 200 may be less than M.

Therefore, it may be assumed that M hyperbolic curves corresponding to the second phase information are present in a section in which the first phase information varies ranging from $-\pi$ to $+\pi$ or ranging from 0 to $2\pi$. Therefore, the UE 200 may estimate the integer ambiguity of the second phase information according to Equation 49.

$$\mathcal{M} = \left\lceil \frac{M}{2\pi} \right\rceil \qquad \text{[Equation 49]}$$

In Equation 49, $\mathcal{M}$ denotes the integer ambiguity of the second phase information and M denotes a ratio between the distance between the third transmitter 100C and the fourth transmitter 100D and the carrier wavelength $\lambda_c$.

The UE 200 may determine the integer ambiguity of the second phase information from the first phase information according to Equation 49, and may perform positioning at a high resolution based on the second phase information.

Figure 10:
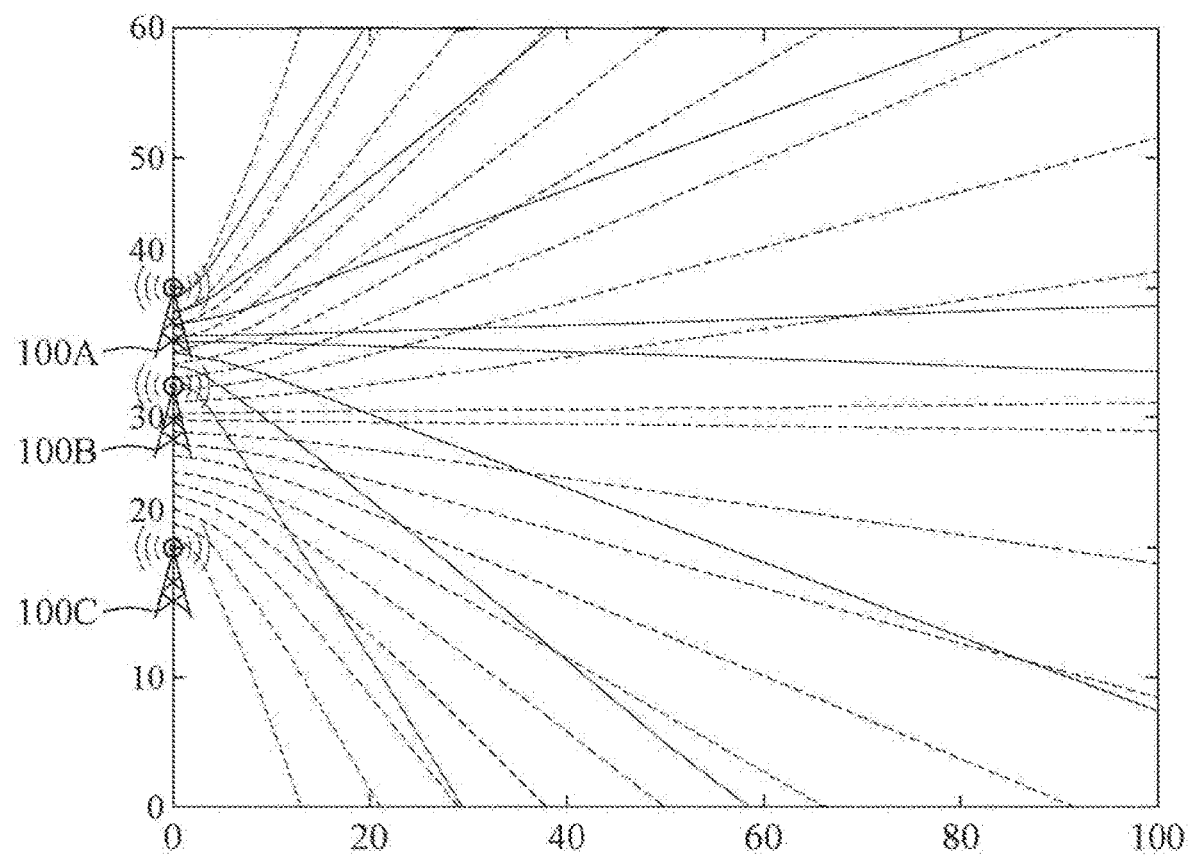
FIG. 10 is a graph showing an example in which three transmitters transmit reference signals according to at least one example embodiment.

FIG. 10 is a graph showing an example in which three transmitters, for example, the first transmitter 100A, the second transmitter 100B, and the third transmitter 100C, transmit reference signals according to at least one example embodiment. Referring to FIG. 10, an interval between the first transmitter 100A and the second transmitter 100B may be less than a carrier wavelength. An interval between the first transmitter 100A and the third transmitter 100C or an interval between the second transmitter 100B and the third transmitter 100C may be greater than the carrier wavelength. The UE 200 may acquire first phase information from a first reference signal and a second reference signal. The UE 200 may acquire second phase information from the first reference signal and a third reference signal. As another example, the UE 200 may acquire the second phase information from the second reference signal and the third reference signal. The UE 200 may determine the integer ambiguity of the second phase information based on the first phase information.

The positioning method and apparatus according to the example embodiments are described above with reference to FIGS. 1 to 10. According to the example embodiments, the UE 200 may receive reference signals transmitted at different positions, and may calculate a difference between a travel distance of the first reference signal and a travel distance of the second reference signal from a conjugate multiplication of two phase vectors. Through this, the UE 200 may perform positioning in a vertical direction or a horizontal direction at high accuracy. Also, the UE 200 may solve an integer ambiguity issue of phase information by analyzing reference signals transmitted from at least three transmitters.

One of ordinary skill in the art may easily understand that the methods and/or processes and operations described herein may be implemented using hardware components, software components, and/or a combination thereof based on the example embodiments. For example, the hardware components may include a general-purpose computer and/or exclusive computing device or a specific computing device or a special feature or component of the specific computing device. The processes may be implemented using one or more processors having an internal and/or external memory, for example, a microprocessor, a controller such as a microcontroller and an embedded microcontroller, a microcomputer, an arithmetic logic unit (ALU), and a digital signal processor such as a programmable digital signal processor or other programmable devices. In addition, or, as an alternative, the processes may be implemented using an application specific integrated circuit (ASIC), a programmable gate array, such as, for example, a field programmable gate array (FPGA), a programmable logic unit (PLU), or a programmable array logic (PAL), and other devices capable of executing and responding to instructions in a defined manner, other devices configured to process electronic devices, and combinations thereof. The processing device may run an operating system (OS) and one or more software applications that run on the OS. Also, the processing device may access, store, manipulate, and create data in response to execution of the software. For purpose of simplicity, the description of a processing device is used as a singular; however, one skilled in the art will appreciate that a processing device may include a plurality of processing elements and/or multiple types of processing elements. For example, the processing device may include a plurality of processor or a single processor and a single controller. In addition, different processing configurations are possible such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable recording media include magnetic media such as hard disks, floppy disks, and magnetic tape; optical media such as CD ROM, DVD, and blue-rays; magneto-optical media such as floptical disks; and hardware devices that are specially to store and perform program instructions, such as read-only memory (ROM), random access memory (RAM), flash memory, and the like. Examples of program instructions include both machine code, such as produced by a compiler and files containing structural programming languages such as C++ object-oriented programming language and high or low programming languages (assembly languages, hardware technical languages, database programming languages and techniques) to run on one of the aforementioned devices and a processor, a processor architecture, or a heterogeneous combination of combinations of different hardware and software components, or a machine capable of executing program instructions. Accordingly, they may include a machine language code, a byte code, and a high language code executable using an interpreter and the like.

Therefore, according to an aspect of at least one example embodiment, the aforementioned methods and combinations thereof may be implemented by one or more computing devices as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to another aspect, devices that perform operations associated with the aforementioned processes may include the aforementioned hardware and/or software. According to another aspect, all of the sequences and combinations associated with the processes are to be included in the scope of the present disclosure.

For example, the described hardware devices may be to act as one or more software modules in order to perform the operations of the above-described example embodiments, or vice versa. The hardware devices may include a processor, such as, for example, an MPU, a CPU, a GPU, a TPU, etc., configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Accordingly, the present disclosure is not limited to the aforementioned example embodiments and may belong to the scope of example embodiments disclosed herein and equally or equivalently modified from the claims. For examples, although the methods may be implemented in different sequence and/or components of systems, structures, apparatuses, circuits, etc., may be combined or integrated in different form or may be replaced with other components or equivalents, appropriate results may be achieved.

Such equally or equivalently modified example embodiments may include logically equivalent methods capable of achieving the same results according to the example embodiments. Accordingly, the present disclosure and the scope thereof are not limited to the aforementioned example embodiments and should be understood as a widest meaning allowable by law.

What is claimed is:

1. A positioning method performed by a user equipment, the positioning method comprising:
   receiving a first reference signal from a first transmitter and receiving a second reference signal from a second transmitter;
   acquiring phase information depending on carrier frequencies of the first reference signal and the second reference signal based on received data of the first reference signal measured at a plurality of sample times and received data of the second reference signal measured at the plurality of sample times; and
   outputting information about a difference between a travel distance of the first reference signal and a travel distance of the second reference signal based on the phase information depending on the carrier frequencies,
   wherein the acquiring of the phase information comprises:
   acquiring a first sample vector based on the received data of the first reference signal,
   acquiring a second sample vector based on the received data of the second reference signal,
   calculating a first phase vector and a second phase vector by performing an inner product operation of a discrete Fourier transform (DFT) coefficient vector for a DFT operation with respect to each of the first sample vector and the second sample vector, and
   acquiring the phase information from a conjugate multiplication of the first phase vector and the second phase vector.

2. The positioning method of claim 1, wherein a waveform of the first reference signal and a waveform of the second reference signal are configured to continue in a time interval greater than a symbol size corresponding to a frequency interval of orthogonal frequency division multiplex (OFDM).

3. The positioning method of claim 1, wherein the first reference signal and the second reference signal are transmitted in different time domains, a first subcarrier group for transmitting the first reference signal and a second subcarrier group for transmitting the second reference signal are the same.

4. The positioning method of claim 1, wherein the first reference signal includes a plurality of subcarriers included in a first subcarrier group, and the second reference signal includes a plurality of subcarriers included in a second subcarrier group, and
   a subcarrier included in the first subcarrier group and a subcarrier included in the second subcarrier group are orthogonal to each other.

5. The positioning method of claim 4, wherein the plurality of subcarriers included in the first subcarrier group and the plurality of subcarriers included in the second subcarrier group are provided at equal intervals in a frequency domain.

6. The positioning method of claim 5, wherein a correction factor is calculated based on a conjugate multiplication between a first component of the second phase vector and a second component of the second phase vector having an angular frequency index different from that of the first component, and the phase information is output based on a result of multiplying the conjugate multiplication of the first phase vector and the second phase vector by the correction factor.

7. The positioning method of claim 6, wherein the acquiring of the phase information comprises calculating a parameter depending on a clock error between the first transmitter and the second transmitter and the terminal among parameters constituting the conjugate multiplication by linearly combining phase angles of components included in the conjugate multiplication.

8. The positioning method of claim 5, wherein a complex signal component of each of the subcarriers included in the first subcarrier group and a complex signal component of each of the subcarriers included in the second subcarrier group have a conjugate relation.

9. The positioning method of claim 8, wherein the second subcarrier group is spaced apart at a desired distance from the first subcarrier group in the frequency domain, and the desired distance is determined based on a number of subcarriers included in the first subcarrier group and a size of a fast Fourier transform (FFT) window.

10. The positioning method of claim 1, further comprising:
receiving reference signals from a transmitter group that includes at least three transmitters;
calculating first phase information based on reference signals received from a first pair of transmitters among the at least three transmitters included in the transmitter group, and calculating second phase information based on reference signals received from a second pair of transmitters among the at least three transmitters; and
determining an integer ambiguity of the second phase information based on the first phase information.

11. The positioning method of claim 10, wherein an interval between the first pair of transmitters is less than an interval between the second pair of transmitters.

12. The positioning method of claim 11, wherein the interval between the first pair of transmitters is less than a carrier wavelength of the reference signals and the interval between the second pair of transmitters is greater than the carrier wavelength of the reference signals.

13. A user equipment comprising:
a communicator; and
a processor,
wherein the processor is configured to perform a process of receiving a first reference signal from a first transmitter, a process of acquiring phase information depending on carrier frequencies of the first reference signal and the second reference signal based on received data of the first reference signal measured at a plurality of sample times and received data of the second reference signal measured at the plurality of sample times, and a process of outputting information about a difference between a travel distance of the first reference signal and a travel distance of the second reference signal based on the phase information depending on the carrier frequencies, and
wherein the process of acquiring of the phase information comprises:
a process of acquiring a first sample vector based on the received data of the first reference signal, acquiring a second sample vector based on the received data of the second reference signal,
a process of calculating a first phase vector and a second phase vector by performing an inner product operation of a discrete Fourier transform (DFT) coefficient vector for a DFT operation with respect to each of the first sample vector and the second sample vector, and
a process of acquiring the phase information from a conjugate multiplication of the first phase vector and the second phase vector.

14. A positioning reference signal transmission method performed by a plurality of transmitters, the method comprising:
transmitting, by a first transmitter, a first reference signal; and
transmitting, by a second transmitter, a second reference signal,
wherein the first reference signal includes at least one subcarrier signal included in a first subcarrier group, and the second reference signal includes at least one subcarrier signal included in a second subcarrier group,
wherein each of the at least one subcarrier signal is generated by a sequence that generates a continuous sine wave at the boundary of the symbols comprising cyclic prefix (CP), and
wherein a complex signal component of each of the subcarriers included in the first subcarrier group and a complex signal component of each of the subcarriers included in the second subcarrier group have a conjugate relation.

15. The method of claim 14, wherein the first reference signal and the second reference signal are transmitted in different time domains and the first subcarrier group and the second subcarrier group are the same.

16. The method of claim 14, wherein the first reference signal includes a plurality of subcarriers included in a first subcarrier group, and the second reference signal includes a plurality of subcarriers included in a second subcarrier group, and
a subcarrier included in the first subcarrier group and a subcarrier included in the second subcarrier group are orthogonal to each other, and the plurality of subcarriers included in the first subcarrier group and the plurality of subcarriers included in the second subcarrier group are provided at equal intervals in a frequency domain.

17. The method of claim 14, further comprising:
transmitting, by at least one additional transmitter excluding the first transmitter and the second transmitter, a reference signal,
wherein, in a transmitter group including the first transmitter, the second transmitter, and the at least one additional transmitter, an interval between a first pair of transmitters and an interval between a second pair of transmitters differ from each other.

18. The method of claim 17, wherein the interval between the first pair of transmitters is less than a carrier wavelength of the reference signals and the interval between the second pair of transmitters is greater than the carrier wavelength of the reference signals.

* * * * *